US012210086B2

(12) United States Patent
Shin et al.

(10) Patent No.: US 12,210,086 B2
(45) Date of Patent: Jan. 28, 2025

(54) SMART-DEVICE-BASED RADAR SYSTEM PERFORMING LOCATION TAGGING

(71) Applicant: Google LLC, Mountain View, CA (US)

(72) Inventors: Dongeek Shin, Santa Clara, CA (US); Ivan Poupyrev, Los Altos, CA (US)

(73) Assignee: Google LLC, Mountain View, CA (US)

( * ) Notice: Subject to any disclaimer, the term of this patent is extended or adjusted under 35 U.S.C. 154(b) by 703 days.

(21) Appl. No.: 17/069,633

(22) Filed: Oct. 13, 2020

(65) Prior Publication Data

US 2022/0113394 A1 Apr. 14, 2022

(51) Int. Cl.
G01S 13/50 (2006.01)
G01S 13/44 (2006.01)
G06N 20/00 (2019.01)

(52) U.S. Cl.
CPC ........ *G01S 13/505* (2013.01); *G01S 13/4463* (2013.01); *G01S 13/449* (2013.01); *G06N 20/00* (2019.01)

(58) Field of Classification Search
CPC .. G01S 13/505; G01S 13/4463; G01S 13/449; G01S 13/345; G01S 13/56; G01S 7/003; G01S 7/415; G01S 7/2883; G01S 7/356; G01S 7/414; G01S 7/417; G01S 7/539; G06N 20/00; G06N 3/045; G06N 3/08; G06F 3/017; H04W 4/02; H04W 4/027; G01C 21/3664
See application file for complete search history.

(56) References Cited

U.S. PATENT DOCUMENTS

| 7,567,200 B1* | 7/2009 | Osterweil | G01S 13/56 |
| | | | 342/28 |
| 9,730,029 B2* | 8/2017 | Choudhury | H04W 4/38 |
| 2005/0060069 A1* | 3/2005 | Breed | G08G 1/166 |
| | | | 701/408 |
| 2008/0019317 A1* | 1/2008 | Vellanki | H04M 1/72457 |
| | | | 370/331 |

(Continued)

FOREIGN PATENT DOCUMENTS

CN 110687816 A * 1/2020 ............. G05B 15/02

OTHER PUBLICATIONS

CN_110687816_A_I_translate.pdf—translation of CN-110687816-A (Year: 2020).*

(Continued)

*Primary Examiner* — Olumide Ajibade Akonai
*Assistant Examiner* — Yonghong Li
(74) *Attorney, Agent, or Firm* — Colby Nipper PLLC

(57) ABSTRACT

Techniques and apparatuses are described that implement a smart-device-based radar system capable of performing location tagging. The radar system has sufficient spatial resolution to recognize different external environments associated with different locations (e.g., recognize different rooms or different locations within a same room). Using the radar system, the smart device can achieve spatial awareness and automatically activate user-programmed applications or settings associated with the different locations. In this way, the radar system enables the smart device to provide a location-specific shortcut for various applications or settings. With the location-specific shortcut, the smart device can improve the user's experience and reduce the need to repeatedly navigate cumbersome interfaces.

20 Claims, 12 Drawing Sheets

(56) References Cited

U.S. PATENT DOCUMENTS

| | | | |
|---|---|---|---|
| 2016/0227379 A1 | 8/2016 | Arastafar et al. | |
| 2017/0328995 A1* | 11/2017 | Marschalkowski | H04W 4/33 |
| 2017/0328997 A1* | 11/2017 | Silverstein | G01S 13/06 |
| 2020/0326422 A1* | 10/2020 | Sagi | G01S 13/9047 |
| 2021/0263131 A1* | 8/2021 | Dalfra | G05D 1/0257 |

OTHER PUBLICATIONS

Mobile phone features—Wikipedia.pdf from https://web.archive.org/web/20190801081202/https://en.wikipedia.org/wiki/Mobile_phone_features (Year: 2019).*

"Infineon's Innovative XENSIV 60 GHz Radar Chip Enables Things to See and Revolutionizes the Human Machine Interface", Accessed on the internet at https://www.infineon.com/cms/en/product/promopages/60GHz/ on May 27, 2020, 6 pages.

Bahl, et al., "RADAR: an In-Building RF-based User Location and Tracking System", Accessed on the internet at https://ieeexplore.ieee.org/document/832252 on May 27, 2020, Mar. 2020, 10 pages.

Tarzia, et al., "Indoor Localization without Infrastructure using the Acoustic Background Spectrum", Accessed on the Internet at https://dl.acm.org/doi/pdf/10.1145/1999995.2000011 on May 27, 2020, 2011, 14 pages.

Tung, et al., "EchoTag: Accurate Infrastructure-Free Indoor Location Tagging with Smartphones", Accessed on the Internet at https://dl.acm.org/doi/pdf/10.1145/2789168.2790102 on May 27, 2020, 2015, 12 pages.

* cited by examiner

SMART-DEVICE-BASED RADAR SYSTEM PERFORMING LOCATION TAGGING

BACKGROUND

Smart devices provide a variety of applications that a user may access throughout the day. For example, a user may use the smart device to read the news during breakfast, use a map application to navigate traffic, view a calendar application at work, look up a recipe to cook dinner, or set a morning alarm to wake up the following day. In some cases, it can be cumbersome to navigate a user interface of the smart device to open a particular application or control a particular setting. Furthermore, if these applications or settings are part of a daily routine, the user may navigate the cumbersome user interface multiple times throughout the week. Therefore it can be advantageous for smart devices to automatically open these application or apply these settings as the user goes about their day.

SUMMARY

Techniques and apparatuses are described that implement a smart-device-based radar system capable of performing location tagging. The radar system has sufficient spatial resolution to recognize different external environments associated with different locations (e.g., recognize different rooms or different locations within a same room). Using the radar system, the smart device can achieve spatial awareness and automatically activate user-programmed applications or settings associated with different locations. In this way, the radar system enables the smart device to provide a location-specific shortcut for various applications or settings. With the location-specific shortcut, the smart device can improve the user's experience and reduce the need to repeatedly navigate cumbersome interfaces.

Aspects described below include a method performed by a radar system of a smart device for location tagging. The method includes transmitting a first radar transmit signal at a first location. The smart device is at the first location. The method also includes receiving a first radar receive signal using multiple receive channels of the radar system. The first radar receive signal comprises a version of the radar transmit signal that is reflected by one or more objects proximate to the first location. The method additionally includes generating a first location signature based on the first radar receive signal. The first location signature represents unique spatial features associated with the one or more objects within the vicinity of the first location. The method further includes recognizing the first location based on a comparison of the first location signature to another previously-stored location signature. Responsive to recognizing the first location, the method includes triggering activation of one or more applications or settings of the smart device. The one or more applications or settings are associated with the other previously-stored location signature.

Aspects described below also include an apparatus comprising a radar system, a processor, and a computer-readable storage medium. The radar system comprises an antenna array and a transceiver with at least two receive channels respectively coupled to antenna elements of the antenna array. The apparatus also includes a processor and a computer-readable storage medium. The computer-readable storage medium comprises computer-executable instructions that, responsive to execution by the processor, implement a location-tagging module. The radar system, the processor, and the computer-readable storage medium are jointly configured to perform any of the described methods.

Aspects described below include a computer-readable storage medium comprising computer-executable instructions that, responsive to execution by a processor, implement a location-tagging module.

Aspects described below also include a system with means for performing location tagging based on complex radar data.

BRIEF DESCRIPTION OF DRAWINGS

Apparatuses for and techniques implementing a smart-device-based radar system capable of performing location tagging are described with reference to the following drawings. The same numbers are used throughout the drawings to reference like features and components:

FIG. 3-1 illustrates operation of an example radar system;

FIG. 3-2 illustrates an example radar framing structure for location tagging;

FIG. 6-1 illustrates an example hardware-abstraction module for location tagging;

FIG. 6-2 illustrates example complex radar data generated by a hardware-abstraction module for location tagging;

DETAILED DESCRIPTION

Figure 1:
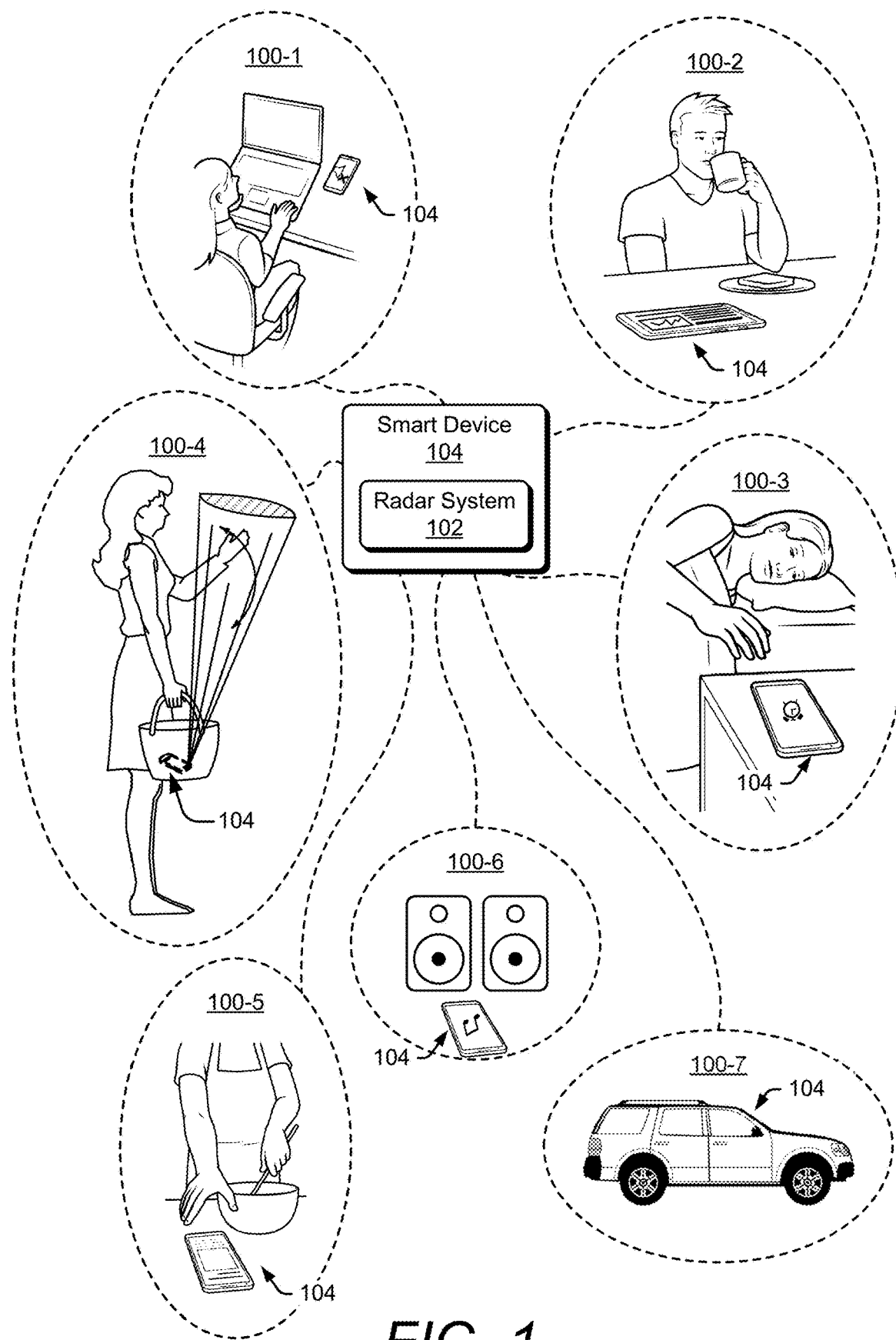
FIG. 1 illustrates example environments in which a smart-device-based radar system capable of performing location tagging can be implemented.

Smart devices provide a variety of applications that a user may access throughout the day. For example, a user may use the smart device to read the news during breakfast, use a map application to navigate traffic, view a calendar application at work, look up a recipe to cook dinner, or set a morning alarm to wake up the following day. In some cases, it can be cumbersome to navigate a user interface of the smart device to open a particular application or control a particular setting. Furthermore, if these applications or settings are part of a daily routine, the user may navigate the cumbersome interface multiple times throughout the week. Therefore it can be advantageous for smart devices to automatically open these application or apply these settings as the user goes about their day.

In some cases, these actions are consistently performed at particular locations. For example, the user may open the news application at the breakfast table, access the map application within the car, utilize the calendar application at work, search for a recipe in the kitchen, and set the alarm clock in bed. Therefore, it can be advantageous for smart devices to develop spatial awareness for particular applications or settings. With the ability to recognize different external environments (e.g., recognize different rooms or different locations within a same room), the smart device can provide a spatial short-cut for user-specified applications or settings. It can be challenging, however, for the smart device to achieve sufficient resolution to identify different locations, especially for various locations that are indoors.

Some smart devices include a Global Navigation Satellite System (GNSS), such as a Global Positioning System (GPS). Using the GNSS, the smart device can capture geo-location information. In many instances, however, the spatial resolution for GNSS is too coarse (e.g., greater than approximately 10 meters) to support indoor localization. Without sufficient spatial resolution, the smart device is unable to distinguish between locations associated with different rooms or distinguish between locations within a same room.

To realize sufficient accuracies for indoor location identification, some spatial localization techniques rely on anchors or beacons. These devices communicate wirelessly with the smart device to enable the location of the smart device to be determined using techniques such as received signal strength indications (RSSI), time of flight, triangulation, trilateration, or some combination thereof. This technique, however, requires the user to purchase and install multiple anchors or beacons in different locations around their house, vehicle, or office, which can be inconvenient.

Other smart devices can include ultrasonic sensors. Due to limited space within the smart device, however, the ultrasonic sensor may include fewer channels. With fewer channels and wavelengths on the order of several meters through air, the ultrasonic sensor can have limited range and angular resolution. As such, it is challenging to form a high-resolution three-dimensional map using ultrasound. Without sufficient resolution, it can be challenging to recognize different locations.

To conserve space, some ultrasonic sensors can utilize the smart device's speaker and microphone. However, these components consume a significant amount of power and drain the battery of the smart device. Power-constrained devices may therefore limit durations for which the ultrasonic sensor operates. As such, the ultrasonic sensor may rely on other sensors to activate it before location sensing can occur.

Additionally, the ultrasonic sensor can be highly susceptible to background interference, including any noise such as human speech, machinery (e.g., air conditioners or fans), or background noise (e.g., traffic, birds, airplanes, or music). The susceptibility to interference can also make it challenging for multiple smart devices with ultrasonic sensors to operate within a same room. Without coordination, the ultrasonic signals produced by a first smart device can make it challenging for a second smart device to accurately generate a map of the external environment.

Also, some ultrasonic sensors are unable to directly measure the Doppler effect. Without the ability to distinguish between moving and stationary (e.g., non-moving) objects, it can be challenging for the ultrasonic sensor to recognize stationary features in an environment. As such, other moving objects can corrupt the ultrasonic sensor's map of the external environment. To address this, some techniques limit the effective range of the ultrasonic sensor. While this can prevent the ultrasonic sensor from detecting many moving objects, it decreases the amount of information available for the ultrasonic sensor to generate a map of the external environment.

In contrast, techniques are described that implement a smart-device-based radar system capable of performing location tagging. The radar system has sufficient spatial resolution to recognize different external environments associated with different locations (e.g., recognize different rooms within a same building, different locations within a same room, locations within different buildings, or a location within a vehicle). Using the radar system, the smart device can achieve spatial awareness and automatically activate user-programmed applications or settings associated with different locations. In this way, the radar system enables the smart device to provide a location-specific shortcut for various applications or settings. With the location-specific shortcut, the smart device can improve the user's experience and reduce the need to repeatedly navigate cumbersome interfaces.

In example implementations, the radar system includes a location-tagging module, which analyzes complex radar data to recognize different locations of the smart device. To generate the complex radar data, the radar system transmits and receives radar signals within the super-high frequency or extremely-high frequency bands. These frequencies enable the radar system to achieve sufficient range and Doppler resolutions for location tagging. With the ability to directly measure Doppler frequencies, the radar system can also readily ignore moving objects in order to identify the stationary features of a room. Additionally, these high frequencies enable the radar system to have a relatively small footprint compared to other types of sensors, such as cameras or ultrasonic sensors. Within this small footprint, the radar system can include multiple receive channels to realize sufficient angular resolution for location tagging. In some cases, the radar system can realize spatial resolutions on the order of centimeters (e.g., approximately one centimeter). The radar system can also operate at low power levels to conserve power and enable the radar system to continuously operate. In this way, the radar system can seamlessly detect various locations without relying on activation by another sensor of the smart device or the user.

Operating Environment

FIG. 1 is an illustration of example environments 100-1 to 100-7 in which techniques using, and an apparatus including, a smart-device-based radar system capable of performing location tagging may be embodied. In the depicted environments 100-1 to 100-7, a smart device 104 includes a radar system 102 capable of tagging and recognizing different locations. The smart device 104 can be a smartphone in environments 100-1 to 100-7.

In the environments 100-1 to 100-7, a user places the smart device 104 in different locations. The environments 100-1 to 100-7 respectively include locations associated with an office (e.g., a location on a work desk), a dining room (e.g., a location on a table), a bedroom (e.g., a location on a nightstand), a purse, a kitchen (e.g., a location on a counter), an entertainment center (e.g., a location next to a pair of speakers), and a vehicle (e.g., a location on a dash of the vehicle). At each of these locations, the radar system 102 analyzes complex radar data to generate a unique location signature (or fingerprint) for that location. This location signature tags the corresponding location and enables the radar system 102 to recognize each location in the future. Additionally, at each of these locations, the user identifies one or more applications or settings to be activated. If the radar system 102 recognizes the current location of the smart device 104 being at any of these previously-identified locations, the radar system 102 triggers the smart device 104 to activate the one or more applications or settings associated with the current location. For example, the radar system 102 in environment 100-1 recognizes that the user is at work and causes the smart device 104 to be in a silent mode that mutes incoming calls. In the environment 100-2, the radar system 102 recognizes that the user is at a breakfast table and causes the smart device 104 to automatically open a news application for the user. In this way, the user can readily read the news when they sit down to eat without having to manually navigate a user interface to open the news application.

In the environment 100-3, the user places the phone on a bedside table. The radar system 102 recognizes this location and triggers the smart device 104 to automatically open an alarm application for the user. In the environment 100-4, the radar system 102 recognizes that the smart device 104 is within a purse and automatically enables gesture recognition via the radar system for touch-free control of the smart device 104. In this way, the user can make various gestures to play music or control the volume of the smart device 104 while the smart device 104 is stored within the purse.

In the environment 100-5, the radar system 102 recognizes that the smart device 104 is in the kitchen and triggers the smart device 104 to open a recipe application so that the user can prepare a meal. In the environment 100-6, the radar system 102 recognizes that the smart device 104 is proximate to a pair of speakers. The radar system 102 therefore causes the smart device 104 to automatically connect wirelessly to the speakers and open a music application to play music through the speakers. In the environment 100-7, the user places the smart device 104 on a dash mount in a vehicle. The radar system 102 recognizes this location and causes the smart device 104 to automatically open a map application to enable the user to navigate current traffic conditions.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth).

To support location tagging, the radar system 102 can realize spatial resolutions on the order of centimeters (e.g., approximately one centimeter) and a maximum unambiguous range of several meters or more (e.g., 1 meter, 2 meters, or 10 meters). This fine resolution enables the radar system 102 to resolve multiple objects in one or more spatial dimensions (e.g., range azimuth, and/or elevation) and identify the size of individual objects. The maximum unambiguous range enables the radar system 102 to recognize locations based on reflections from objects at farther distances, including walls, corners where walls connect, and other furniture within the vicinity. The smart device 104 and the radar system 102 are further described with respect to FIG. 2.

Figure 2:
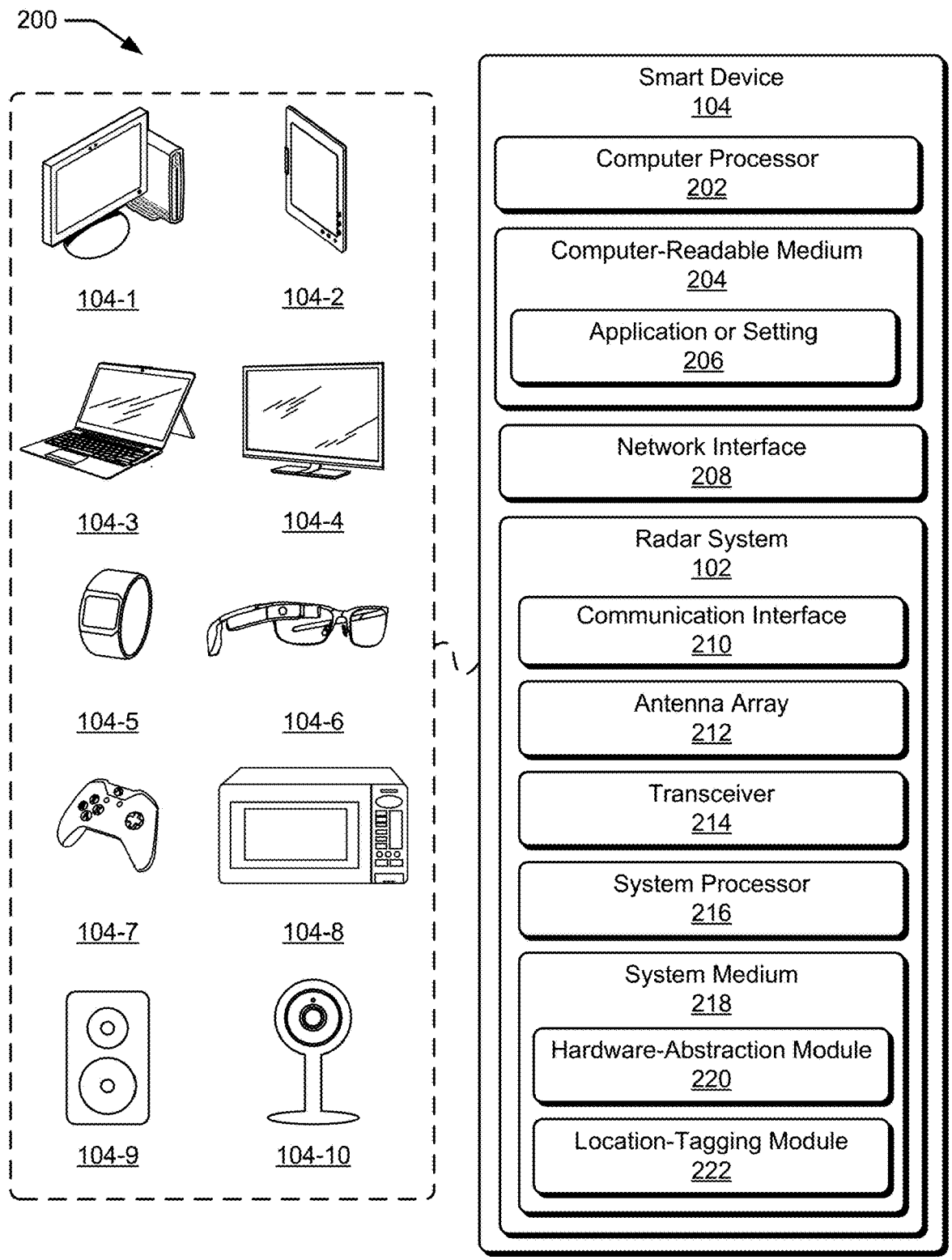
FIG. 2 illustrates an example implementation of a radar system as part of a smart device.

FIG. 2 illustrates the radar system 102 as part of the smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, a smart speaker 104-9, and a smart security camera. Other devices may also be used, such as a home service device, a smart thermostat, a security camera, a baby monitor, a Wi-Fi™ router, a drone, a trackpad, a drawing pad, a netbook, an e-reader, a home automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and at least one computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes an application or setting 206, which activates in response to the radar system 102 recognizing that the smart device 104 is at a particular location. Example applications 206 can include an alarm clock, a calendar, a map application, a news application, a social media application, an email application, and so forth. Example settings 206 can include a volume setting (e.g., a silent mode), a wireless setting (e.g., a Bluetooth™ pairing or a Wi-Fi™ network connection), or a power setting (e.g., a power-saving setting or a low-power mode).

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 210 to transmit the location data to a remote device, though this need not be used when the radar system 102 is integrated within the smart device 104. In general, the location data provided by the communication interface 210 is in a format usable to activate the application or setting 206.

The radar system 102 also includes at least one antenna array 212 and at least one transceiver 214 to transmit and receive radar signals. The antenna array 212 includes at least one transmit antenna element and at least two receive antenna elements. In some situations, the antenna array 212 includes multiple transmit antenna elements to implement a multiple-input multiple-output (MIMO) radar capable of transmitting multiple distinct waveforms at a given time (e.g., a different waveform per transmit antenna element).

The antenna elements can be circularly polarized, horizontally polarized, vertically polarized, or a combination thereof.

The receive antenna elements of the antenna array 212 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object). An element spacing associated with the receive antenna elements can be less than, greater than, or equal to half a center wavelength of the radar signal.

The transceiver 214 includes circuitry and logic for transmitting and receiving radar signals via the antenna array 212. Components of the transceiver 214 can include amplifiers, phase shifters, mixers, switches, analog-to-digital converters, or filters for conditioning the radar signals. The transceiver 214 also includes logic to perform in phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 24 GHz and 80 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. In some cases, the bandwidths are approximately 20% or more of a center frequency to implement an ultrawideband radar.

Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 216 and at least one system medium 218 (e.g., one or more computer-readable storage media). The system medium 218 optionally includes a hardware-abstraction module 220. The system medium 218 also includes a location-tagging module 222. The hardware-abstraction module 220 and the location-tagging module 222 can be implemented using hardware, software, firmware, or a combination thereof. In this example, the system processor 216 implements the hardware-abstraction module 220 and the location-tagging module 222. Together, the hardware-abstraction module 220 and the location-tagging module 222 enable the system processor 216 to process responses from the receive antenna elements in the antenna array 212 to perform location tagging.

In an alternative implementation (not shown), the hardware-abstraction module 220 and the location-tagging module 222 are included within the computer-readable medium 204 and implemented by the computer processor 202. This enables the radar system 102 to provide the smart device 104 raw data via the communication interface 210 such that the computer processor 202 can process the raw data for location tagging.

The hardware-abstraction module 220 transforms raw data provided by the transceiver 214 into hardware-agnostic data, which can be processed by the location-tagging module 222. In particular, the hardware-abstraction module 220 conforms complex data from a variety of different types of radar signals to an expected input of location-tagging module 222. This enables the location-tagging module 222 to process different types of radar signals received by the radar system 102, including those that utilize different modulations schemes for frequency-modulated continuous-wave radar, phase-modulated spread spectrum radar, or impulse radar. The hardware-abstraction module 220 can also normalize complex data from radar signals with different center frequencies, bandwidths, transmit power levels, or pulsewidths.

Additionally, the hardware-abstraction module 220 conforms complex data generated using different hardware architectures. Different hardware architectures can include different antenna arrays 212 positioned on different surfaces of the smart device 104 or different sets of antenna elements within an antenna array 212. By using the hardware-abstraction module 220, the location-tagging module 222 can process complex data generated by different sets of antenna elements with different gains, different sets of antenna elements of various quantities, or different sets of antenna elements with different antenna element spacings.

By using the hardware-abstraction module 220, the location-tagging module 222 can operate in radar systems 102 with different limitations that affect the available radar modulation schemes, transmission parameters, or types of hardware architectures. The hardware-abstraction module 220 is further described with respect to FIGS. 6-1 and 6-2.

The location-tagging module 222 analyzes the hardware-agnostic data to recognize the location of the smart device 104. Prior to passing the hardware-agnostic data to a machine-learned module or a query module, the location-tagging module 222 can filter (e.g., remove) moving objects from the hardware-agnostic data. During calibration or a training procedure, the location-tagging module 222 stores (e.g., saves) a location signature for a current location. During normal operations, the location-tagging module 222 determines whether a current location signature matches a previously-stored location signature. Based on this comparison, the location-tagging module 222 recognizes the current location of the smart device 104 and informs the computer processor 202 of this location. In response, the computer processor 202 activates the associated application or setting 206.

In some cases, the location-tagging module 222 can include a suite of machine-learning architectures that can be individually selected according to the type of smart device 104. Designs of the machine-learning architectures can be tailored to support smart devices 104 with different amounts of available memory, different amounts available power, or different computational capabilities. The location-tagging module 222 is further described with respect to FIG. 7.

Figures 1, 3:
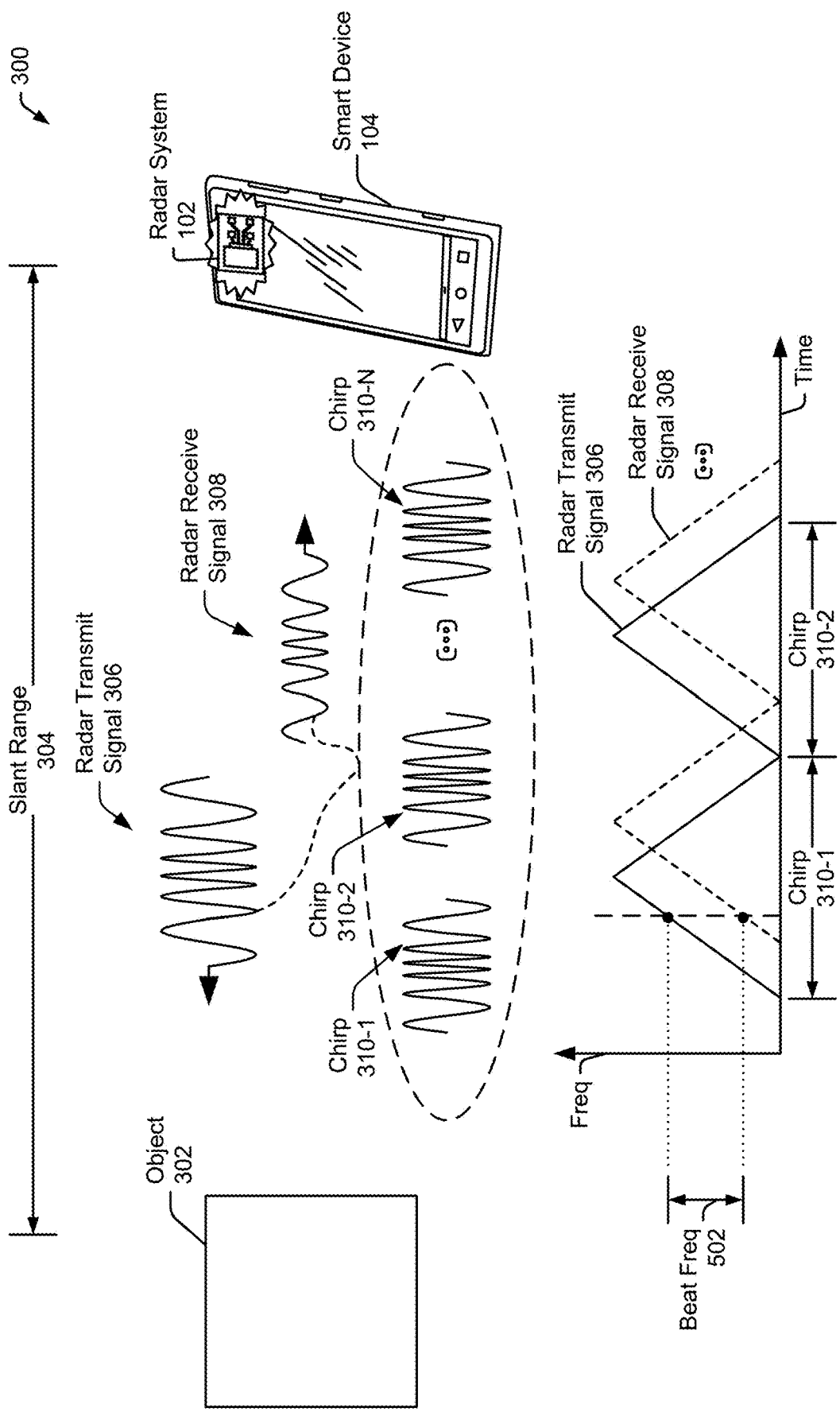
Figures 2, 3:
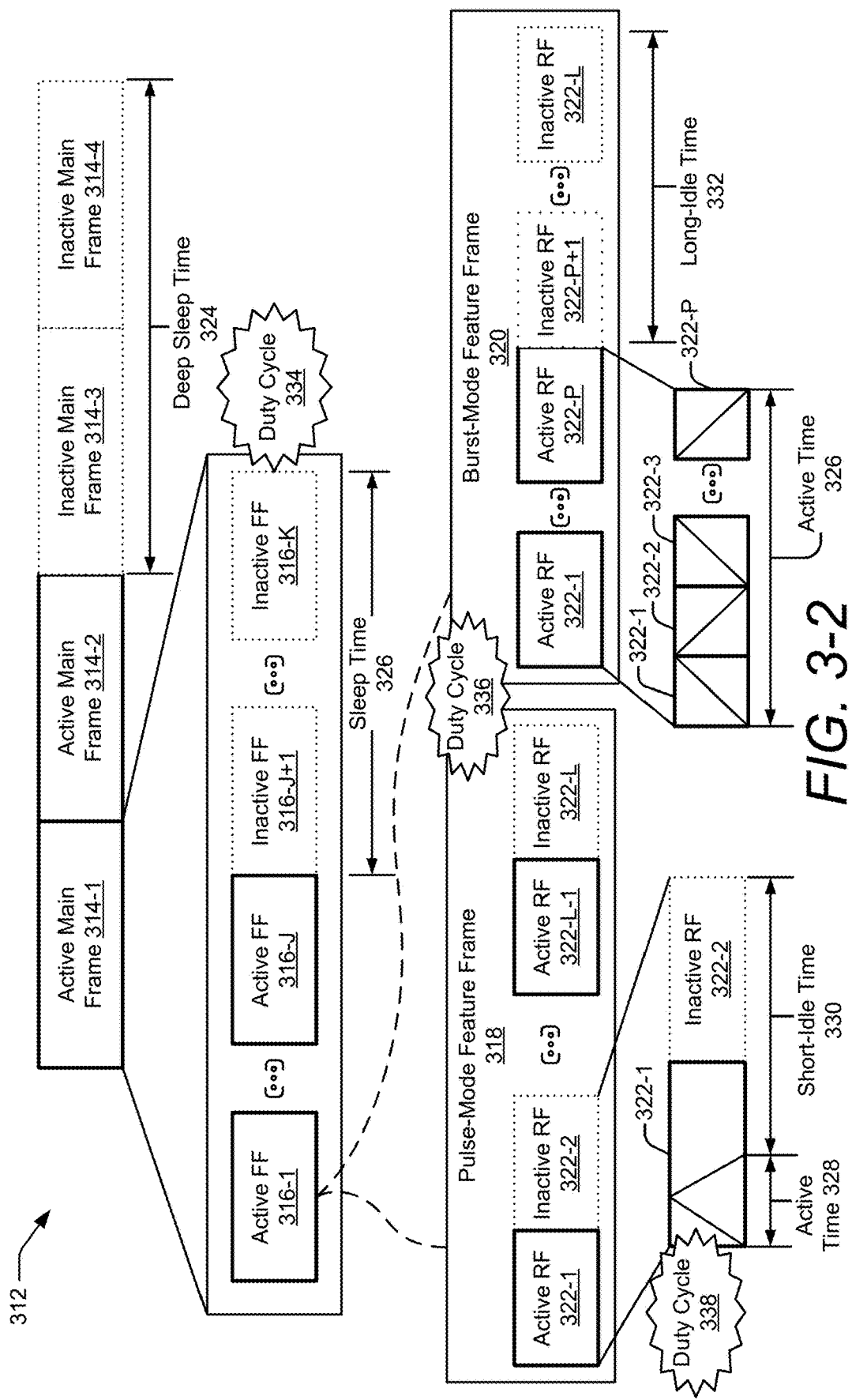

FIG. 3-1 illustrates an example operation of the radar system 102. In the depicted configuration, the radar system 102 is implemented as a frequency-modulated continuous-wave radar. However, other types of radar architectures can be implemented, as described above with respect to FIG. 2. In environment 300, an object 302 is located at a particular slant range 304 from the radar system 102. To detect the object 302, the radar system 102 transmits a radar transmit signal 306. At least a portion of the radar transmit signal 306 is reflected by the object 302. This reflected portion represents a radar receive signal 308. The radar system 102 receives the radar receive signal 308 and processes the radar receive signal 308 to extract data for location tagging. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-N, where N represents a positive integer greater than one. The radar system 102 can transmit the chirps 310-1 to 310-N in a continuous burst or transmit the chirps 310-1 to 310-N as time-separated pulses, as further described with respect to FIG. 3-2. A duration of each chirp 310-1 to 310-N can be on the order of tens or thousands of microseconds (e.g., between approximately 30 microseconds (µs) and 5 milliseconds (ms)), for instance.

Individual frequencies of the chirps 310 1 to 310-N can increase or decrease over time. In the depicted example, the radar system 102 employs a two-slope cycle (e.g., triangular frequency modulation) to linearly increase and linearly decrease the frequencies of the chirps 310-1 to 310-N over time. The two-slope cycle enables the radar system 102 to measure the Doppler frequency shift caused by motion of the object 302. In general, transmission characteristics of the chirps 310-1 to 310-N (e.g., bandwidth, center frequency, duration, and transmit power) can be tailored to achieve a particular detection range, range resolution, or Doppler sensitivity for detecting one or more characteristics the object 302.

At the radar system 102, the radar receive signal 308 represents a delayed version of the radar transmit signal 306. The amount of delay is proportional to the slant range 304 (e.g., distance) from the antenna array 212 of the radar system 102 to the object 302. In particular, this delay represents a summation of a time it takes for the radar transmit signal 306 to propagate from the radar system 102 to the object 302 and a time it takes for the radar receive signal 308 to propagate from the object 302 to the radar system 102. If the object 302 is moving, the radar receive signal 308 is shifted in frequency relative to the radar transmit signal 306 due to the Doppler effect. Similar to the radar transmit signal 306, the radar receive signal 308 is composed of one or more of the chirps 310-1 to 310-N.

The multiple chirps 310-1 to 310-N enable the radar system 102 to make multiple observations of the object 302 over a predetermined time period. A radar framing structure determines a timing of the chirps 310-1 to 310-N, as further described with respect to FIG. 3-2.

FIG. 3-2 illustrates an example radar framing structure 312 for location tagging. In the depicted configuration, the radar framing structure 312 includes three different types of frames. At a top level, the radar framing structure 312 includes a sequence of main frames 314, which can be in the active state or the inactive state. Generally speaking, the active state consumes a larger amount of power relative to the inactive state. At an intermediate level, the radar framing structure 312 includes a sequence of feature frames 316, which can similarly be in the active state or the inactive state. Different types of feature frames 316 include a pulse-mode feature frame 318 (shown at the bottom-left of FIG. 3-2) and a burst-mode feature frame 320 (shown at the bottom-right of FIG. 3-2). At a low level, the radar framing structure 312 includes a sequence of radar frames (RF) 322, which can also be in the active state or the inactive state.

The radar system 102 transmits and receives a radar signal during an active radar frame 322. In some situations, the radar frames 322 are individually analyzed for basic radar operations, such as search and track, clutter map generation, user location determination, and so forth. Radar data collected during each active radar frame 322 can be saved to a buffer after completion of the radar frame 322 or provided directly to the system processor 216 of FIG. 2.

The radar system 102 analyzes the radar data across multiple radar frames 322 (e.g., across a group of radar frames 322 associated with an active feature frame 316) to identify a particular feature. Example types of features include one or more stationary objects within the external environment, material characteristics of these one or more objects (e.g., reflective properties), physical characteristics (e.g., size) of these one or more objects. To perform location tagging during an active main frame 314, the radar system 102 analyzes the radar data associated with one or more active feature frames 316.

A duration of the main frame 314 may be on the order of milliseconds or seconds (e.g., between approximately 10 ms and 10 seconds (s)). After active main frames 314-1 and 314-2 occur, the radar system 102 is inactive, as shown by inactive main frames 314-3 and 314-4. A duration of the inactive main frames 314-3 and 314-4 is characterized by a deep sleep time 324, which may be on the order of tens of milliseconds or more (e.g., greater than 50 ms). In an example implementation, the radar system 102 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 324.

In the depicted radar framing structure 312, each main frame 314 includes K feature frames 316, where K is a positive integer. If the main frame 314 is in the inactive state, all of the feature frames 316 associated with that main frame 314 are also in the inactive state. In contrast, an active main frame 314 includes J active feature frames 316 and K-J inactive feature frames 316, where J is a positive integer that is less than or equal to K. A quantity of feature frames 316 can be adjusted based on a complexity of the environment or a complexity of a gesture. For example, a main frame 314 can include a few to a hundred feature frames 316 (e.g., K may equal 2, 10, 30, 60, or 100). A duration of each feature frame 316 may be on the order of milliseconds (e.g., between approximately 1 ms and 50 ms).

To conserve power, the active feature frames 316-1 to 316-J occur prior to the inactive feature frames 316-(J+1) to 316-K. A duration of the inactive feature frames 316-(J+1) to 316-K is characterized by a sleep time 326. In this way, the inactive feature frames 316-(J+1) to 316-K are consecutively executed such that the radar system 102 can be in a powered-down state for a longer duration relative to other techniques that may interleave the inactive feature frames 316-(J+1) to 316-K with the active feature frames 316-1 to 316-J. Generally speaking, increasing a duration of the sleep time 326 enables the radar system 102 to turn off components within the transceiver 214 that require longer start-up times.

Each feature frame 316 includes L radar frames 322, where L is a positive integer that may or may not be equal to J or K. In some implementations, a quantity of radar frames 322 may vary across different feature frames 316 and may comprise a few frames or hundreds of frames (e.g., L may equal 5, 15, 30, 100, or 500). A duration of a radar frame 322 may be on the order of tens or thousands of microseconds (e.g., between approximately 30 μs and 5 ms). The radar frames 322 within a particular feature frame 316 can be customized for a predetermined detection range, range resolution, or doppler sensitivity, which facilitates detection of a particular feature or gesture. For example, the radar frames 322 may utilize a particular type of modulation, bandwidth, frequency, transmit power, or timing. If the feature frame 316 is in the inactive state, all of the radar frames 322 associated with that feature frame 316 are also in the inactive state.

The pulse-mode feature frame 318 and the burst-mode feature frame 320 include different sequences of radar frames 322. Generally speaking, the radar frames 322 within an active pulse-mode feature frame 318 transmit pulses that are separated in time by a predetermined amount. This disperses observations over time, which can make it easier for the radar system 102 to recognize a gesture due to larger changes in the observed chirps 310-1 to 310-N within the pulse-mode feature frame 318 relative to the burst-mode feature frame 320. In contrast, the radar frames 322 within an active burst-mode feature frame 320 transmit pulses continuously across a portion of the burst-mode feature frame 320 (e.g., the pulses are not separated by a predetermined amount of time). This enables an active-burst-mode feature frame 320 to consume less power than the pulse-mode feature frame 318 by turning off a larger quantity of components, including those with longer start-up times, as further described below.

Within each active pulse-mode feature frame 318, the sequence of radar frames 322 alternates between the active state and the inactive state. Each active radar frame 322 transmits a chirp 310 (e.g., a pulse), which is illustrated by a triangle. A duration of the chirp 310 is characterized by an active time 328. During the active time 328, components within the transceiver 214 are powered-on. During a short-idle time 330, which includes the remaining time within the active radar frame 322 and a duration of the following inactive radar frame 322, the radar system 102 conserves power by turning off one or more active components within the transceiver 214 that have a start-up time within a duration of the short-idle time 330.

An active burst-mode feature frame 320 includes P active radar frames 322 and L-P inactive radar frames 322, where P is a positive integer that is less than or equal to L. To conserve power, the active radar frames 322-1 to 322-P occur prior to the inactive radar frames 322-(P+1) to 322-L. A duration of the inactive radar frames 322-(P+1) to 322-L is characterized by a long-idle time 332. By grouping the inactive radar frames 322-(P+1) to 322-L together, the radar system 102 can be in a powered-down state for a longer duration relative to the short-idle time 330 that occurs during the pulse-mode feature frame 318. Additionally, the radar system 102 can turn off additional components within the transceiver 214 that have start-up times that are longer than the short-idle time 330 and shorter than the long-idle time 332.

Each active radar frame 322 within an active burst-mode feature frame 320 transmits a portion of the chirp 310. In this example, the active radar frames 322-1 to 322-P alternate between transmitting a portion of the chirp 310 that increases in frequency and a portion of the chirp 310 that decreases in frequency.

The radar framing structure 312 enables power to be conserved through adjustable duty cycles within each frame type. A first duty cycle 334 is based on a quantity of active feature frames 316 (J) relative to a total quantity of feature frames 316 (K). A second duty cycle 336 is based on a quantity of active radar frames 322 (e.g., L/2 or P) relative to a total quantity of radar frames 322 (L). A third duty cycle 338 is based on a duration of the chirp 310 relative to a duration of a radar frame 322.

Consider an example radar framing structure 312 for a power state that consumes approximately 2 milliwatts (mW) of power and has a main-frame update rate between approximately 1 and 4 hertz (Hz). In this example, the radar framing structure 312 includes a main frame 314 with a duration between approximately 250 ms and 1 second. The main frame 314 includes thirty-one pulse-mode feature frames 318 (e.g., K is equal to 31). One of the thirty-one pulse-mode feature frames 318 is in the active state. This results in the duty cycle 334 being approximately equal to 3.2%. A duration of each pulse-mode feature frame 318 is between approximately 8 and 32 ms. Each pulse-mode feature frame 318 is composed of eight radar frames 322 (e.g., L is equal to 8). Within the active pulse-mode feature frame 318, all eight radar frames 322 are in the active state. This results in the duty cycle 336 being equal to 100%. A duration of each radar frame 322 is between approximately 1 and 4 ms. An active time 328 within each of the active radar frames 322 is between approximately 32 and 128 μs. As such, the resulting duty cycle 338 is approximately 3.2%. This example radar framing structure 312 has been found to yield good performance results. These good performance results are in terms of good location tagging while also yielding good power efficiency results in the application context of a handheld smartphone in a low-power state. Generation of the radar transmit signal 306 (of FIG. 3-1) and the processing of the radar receive signal 308 (of FIG. 3-1) are further described with respect to FIG. 4.

Figure 4:
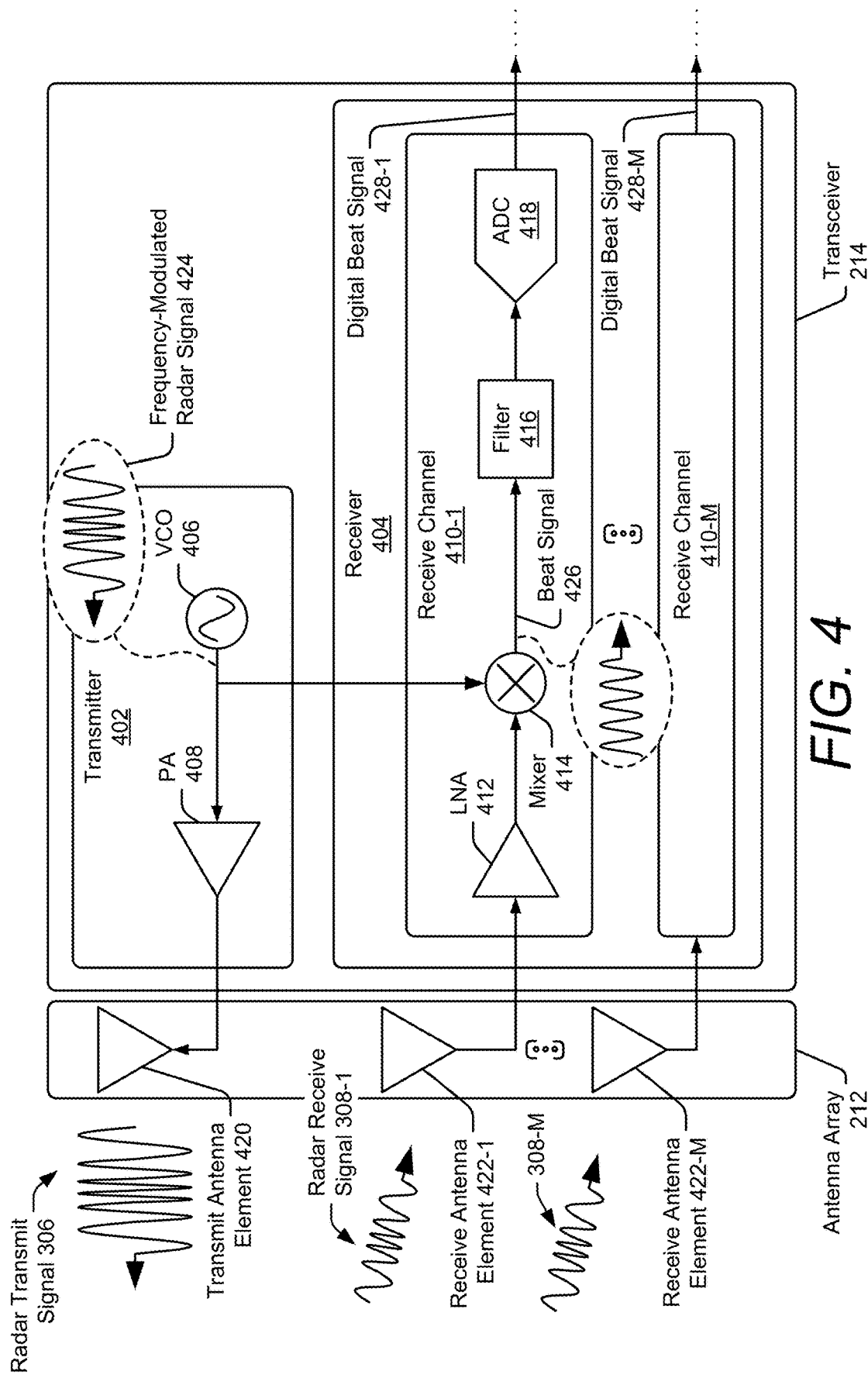
FIG. 4 illustrates an example antenna array and an example transceiver of a radar system.

FIG. 4 illustrates an example antenna array 212 and an example transceiver 214 of the radar system 102. In the depicted configuration, the transceiver 214 includes a transmitter 402 and a receiver 404. The transmitter 402 includes at least one voltage-controlled oscillator 406 and at least one power amplifier 408. The receiver 404 includes at least two receive channels 410-1 to 410-M, where M is a positive integer greater than one. Each receive channel 410-1 to 410-M includes at least one low-noise amplifier 412, at least one mixer 414, at least one filter 416, and at least one analog-to-digital converter 418. The antenna array 212 includes at least one transmit antenna element 420 and at least two receive antenna elements 422-1 to 422-M. The transmit antenna element 420 is coupled to the transmitter 402. The receive antenna elements 422-1 to 422-M are respectively coupled to the receive channels 410-1 to 410-M.

During transmission, the voltage-controlled oscillator 406 generates a frequency-modulated radar signal 424 at radio frequencies. The power amplifier 408 amplifies the frequency-modulated radar signal 424 for transmission via the transmit antenna element 420. The transmitted frequency-modulated radar signal 424 is represented by the radar transmit signal 306, which can include multiple chirps 310-1 to 310-N based on the radar framing structure 312 of FIG. 3-2. As an example, the radar transmit signal 306 is generated according to the burst-mode feature frame 320 of FIG. 3-2 and includes 16 chirps 310 (e.g., N equals 16).

During reception, each receive antenna element 422-1 to 422-M receives a version of the radar receive signal 308-1 to 308-M. In general, relative phase differences between these versions of the radar receive signals 308-1 to 308-M are due to differences in locations of the receive antenna elements 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 to generate a beat signal 426.

A frequency of the beat signal 426 represents a frequency difference between the frequency-modulated radar signal 424 and the radar receive signal 308, which is proportional to the slant range 304 of FIG. 3-1. Although not shown, the beat signal 426 can include multiple frequencies, which represents reflections from different objects or portions of an object within the external environment. In some cases, these different objects move at different speeds, move in different directions, or are positioned at different slant ranges relative to the radar system 102.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216, as shown in FIG. 5.

Figure 5:
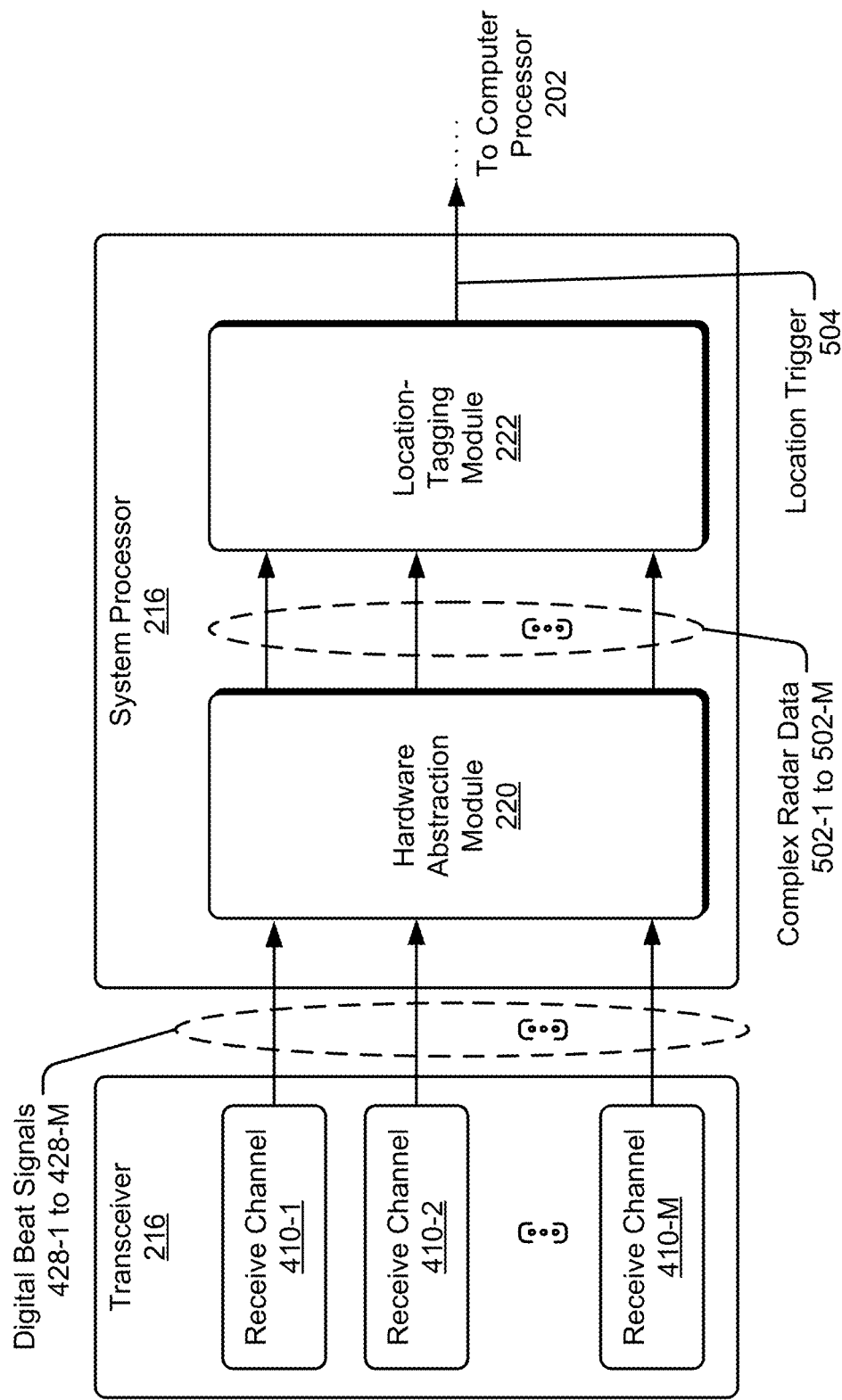
FIG. 5 illustrates an example scheme implemented by a radar system for performing location tagging.

FIG. 5 illustrates an example scheme implemented by the radar system 102 for performing location tagging. In the depicted configuration, the system processor 216 implements the hardware-abstraction module 220 and the location-tagging module 222. The system processor 216 is connected to the receive channels 410-1 to 410-M and can also communicate with the computer processor 202 (of FIG. 2). Although not shown, the hardware-abstraction module 220 and/or the location-tagging module 222 can alternatively be implemented by the computer processor 202.

In this example, the hardware-abstraction module 220 accepts the digital beat signals 428-1 to 428-M from the receive channels 410-1 to 410-M. The digital beat signals 428-1 to 428-M represent raw or unprocessed complex data. The hardware-abstraction module 220 performs one or more operations to generate complex radar data 502-1 to 502-M based on digital beat signals 428-1 to 428-M. The hardware-abstraction module 220 transforms the complex data provided by the digital beat signals 428-1 to 428-M into a form that is expected by the location-tagging module 222. In some cases, the hardware-abstraction module 220 normalizes amplitudes associated with different transmit power levels or transforms the complex data into a frequency-domain representation.

The complex radar data 502-1 to 502-M includes both magnitude and phase information (e.g., in-phase and quadrature components). In some implementations, the complex radar data 502-1 to 502-M includes range-Doppler maps for each receive channel 410-1 to 410-M and for a particular active feature frame 316, as further described with respect to FIG. 6-2. In other implementations the complex radar data 502-1 to 502-M includes angular information. In some cases, the angular information is implicit within the complex radar data 502-1 to 502-M, such as within the multiple range-Doppler maps. In other cases, the hardware abstraction module 220 performs digital beamforming to explicitly provide the angular information, such as in the form of a four-dimensional range-Doppler-azimuth-elevation map. Other forms of the complex radar data 502-1 to 502-M are also possible. For example, the complex radar data 502-1 to 502-M can include complex interferometry data for each receive channel 410-1 to 410-M. The complex interferometry data is an orthogonal representation of the range-Doppler map. In yet another example, the complex radar data 502-1 to 502-M includes frequency-domain representations of the digital beat signals 428-1 to 428-M for an active feature frame 316. Although not shown, other implementations of the radar system 102 can provide the digital beat signals 428-1 to 428-M directly to the location-tagging module 222. In general, the complex radar data 502-1 to 502-M includes at least Doppler information as well as spatial information for one or more dimensions (e.g., range, azimuth, or elevation).

The location-tagging module 222 analyzes the complex radar data 502-1 to 502-M and generates a location trigger 504. The location trigger 504 includes a signal that identifies the location of the smart device 104 and/or triggers the activation of a user-specified application or setting 206 (of FIG. 2) associated with the identified location. For example, the location-tagging module 222 provides the location trigger 504 to the computer processor 202. Based on the location trigger 504, the computer processor 202 opens an application 206 or activates a setting 206 of the smart device 104. An example implementation of the location-tagging module 222 is further described with respect to FIG. 7.

Figures 1, 6:
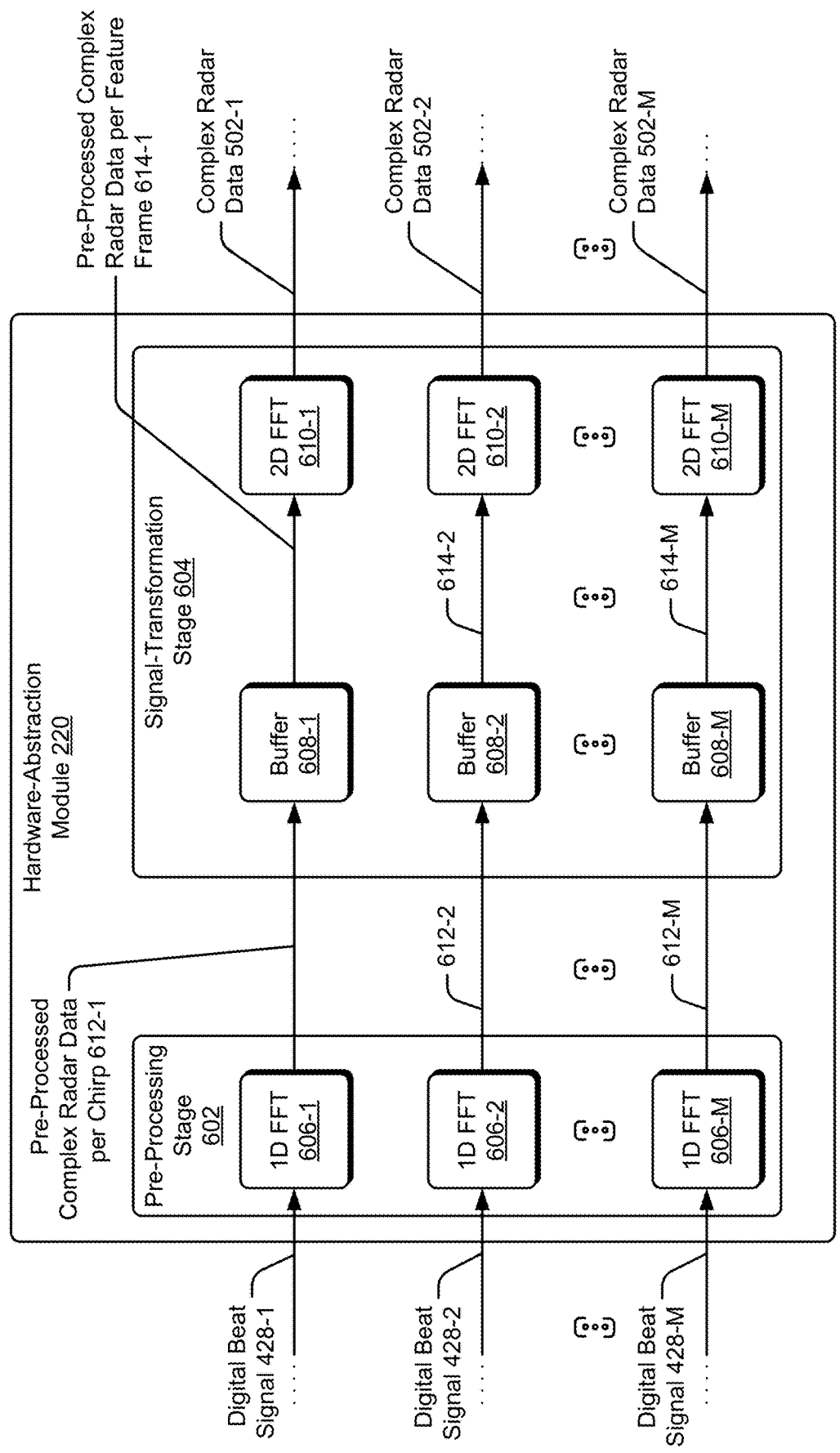
Figures 2, 6:
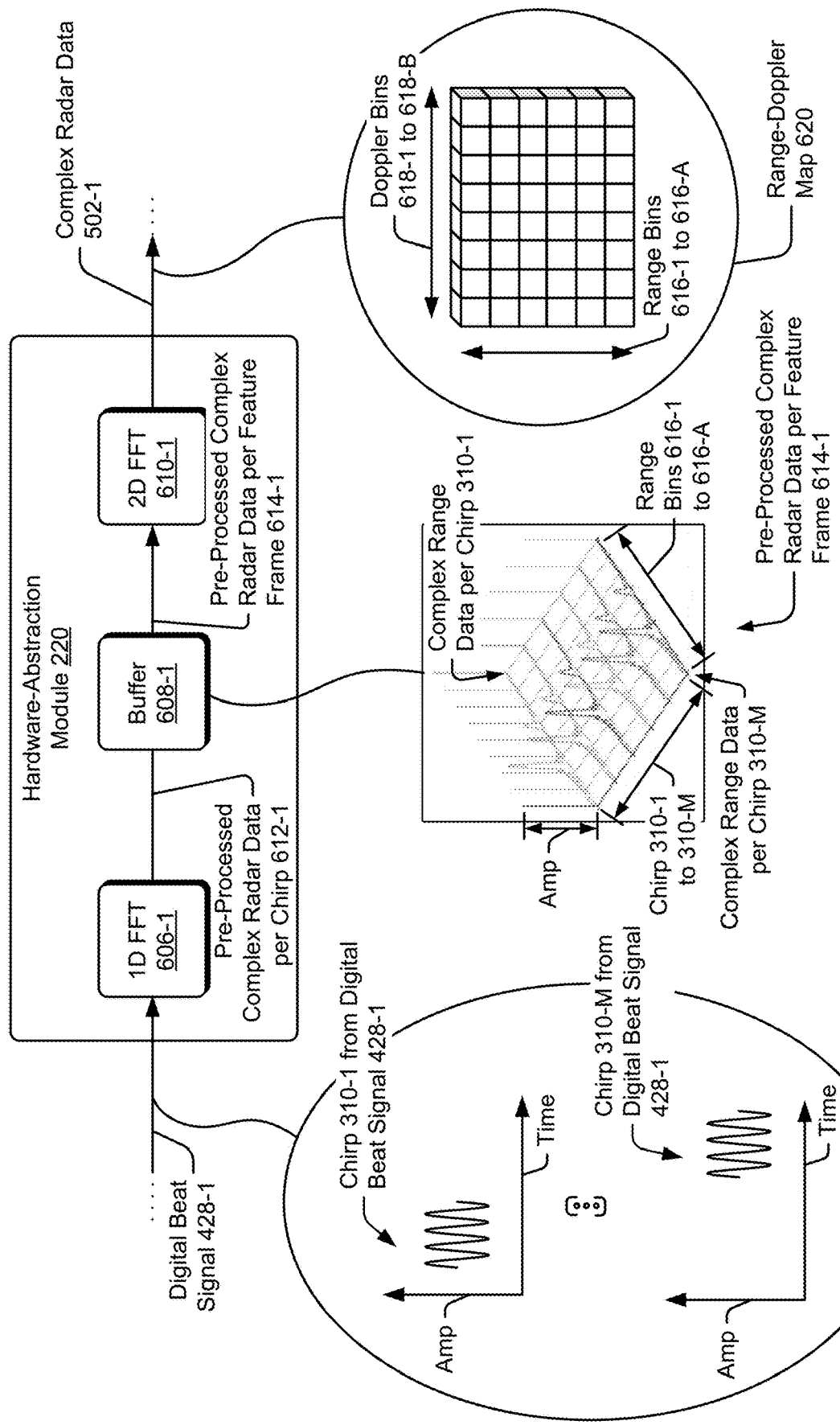

FIG. 6-1 illustrates an example hardware-abstraction module 220 for location tagging. In the depicted configuration, the hardware-abstraction module 220 includes a pre-processing stage 602 and a signal-transformation stage 604. The pre-processing stage 602 operates on each chirp 310-1 to 310-N within the digital beat signals 428-1 to 428-M. In other words, the pre-processing stage 602 performs an operation for each active radar frame 322. In this example, the pre-processing stage 602 includes one-dimensional (1D) Fast-Fourier Transform (FFT) modules 606-1 to 606-M, which respectively process the digital beat signals 428-1 to 428-M. Other types of modules that perform similar operations are also possible, such as a Fourier Transform module.

The signal-transformation stage 604 operates on the sequence of chirps 310-1 to 310-M within each of the digital beat signals 428-1 to 428-M. In other words, the signal-transformation stage 604 performs an operation for each active feature frame 316. In this example, the signal-transformation stage 604 includes buffers 608-1 to 608-M and two-dimensional (2D) FFT modules 610-1 to 610-M.

During reception, the one-dimensional FFT modules 606-1 to 606-M perform individual FFT operations on the chirps 310-1 to 310-M within the digital beat signals 428-1 to 428-M. Assuming the radar receive signals 308-1 to 308-M include 16 chirps 310-1 to 310-N (e.g., N equals 16), each one-dimensional FFT module 606-1 to 606 M performs 16 FFT operations to generate pre-processed complex radar data per chirp 612-1 to 612-M. As the individual operations are performed, the buffers 608-1 to 608-M store the results. Once all of the chirps 310-1 to 310-M associated with an active feature frame 316 have been processed by the pre-processing stage 602, the information stored by the buffers 608-1 to 608-M represents pre-processed complex radar data per feature frame 614-1 to 614-M for the corresponding receive channels 410-1 to 410-M.

Two-dimensional FFT modules 610-1 to 610-M respectively process the pre-processed complex radar data per feature frame 614-1 to 614-M to generate the complex radar data 502-1 to 502-M. In this case, the complex radar data 502-1 to 502-M includes range-Doppler maps, as further described with respect to FIG. 6-2.

FIG. 6-2 illustrates example complex radar data 502-1 generated by the hardware-abstraction module 220 for location tagging. The hardware-abstraction module 220 is shown to process a digital beat signal 428-1 associated with the receive channel 410-1. The digital beat signal 428-1 includes the chirps 310-1 to 310-M, which are time-domain signals. The chirps 310-1 to 310-M are passed to the one-dimensional FFT module 606-1 in an order in which they are received and processed by the transceiver 214.

As described above, the one-dimensional FFT module 606-1 performs an FFT operation on a first chirp 310-1 of the digital beat signal 428-1 at a first time. The buffer 608-1 stores a first portion of the pre-processed complex radar data 612-1, which is associated with the first chirp 310-1. The one-dimensional FFT module 606-1 continues to process subsequent chirps 310-2 to 310-N, and the buffer 608-1 continues to store the corresponding portions of the pre-processed complex radar data 612-1. This process continues until the buffer 608-1 stores a last portion of the pre-processed complex radar data 612-M, which is associated with the chirp 310-M.

At this point, the buffer 608-1 stores pre-processed complex radar data associated with a particular feature frame 614-1. The pre-processed complex radar data per feature frame 614-1 represents magnitude information (as shown) and phase information (not shown) across different chirps 310-1 to 310-N and across different range bins 616-1 to 616-A, where A represents a positive integer.

The two-dimensional FFT 610-1 accepts the pre-processed complex radar data per feature frame 614-1 and performs a two-dimensional FFT operation to form the complex radar data 502-1, which represents a range-Doppler map 620. The range-Doppler map 620 includes complex data for the range bins 616-1 to 616-A and Doppler bins 618-1 to 618-B, where B represents a positive integer. In other words, each range bin 616-1 to 616-A and Doppler bin 618-1 to 618-B includes a complex number with real and imaginary parts that together represent magnitude and phase information. The quantity of range bins 616-1 to 616-A can be on the order of tens or hundreds, such as 32, 64, or 128 (e.g., A equals 32, 64, or 128). The quantity of Doppler bins can be on the order of tens or hundreds, such as 16, 32, 64, or 124 (e.g., B equals 16, 32, 64, or 124). The complex radar data 502-1, along with the complex radar data 502-2 to 502-M (of FIG. 6-1), are provided to the location-tagging module 222, as shown in FIG. 7.

Figure 7:
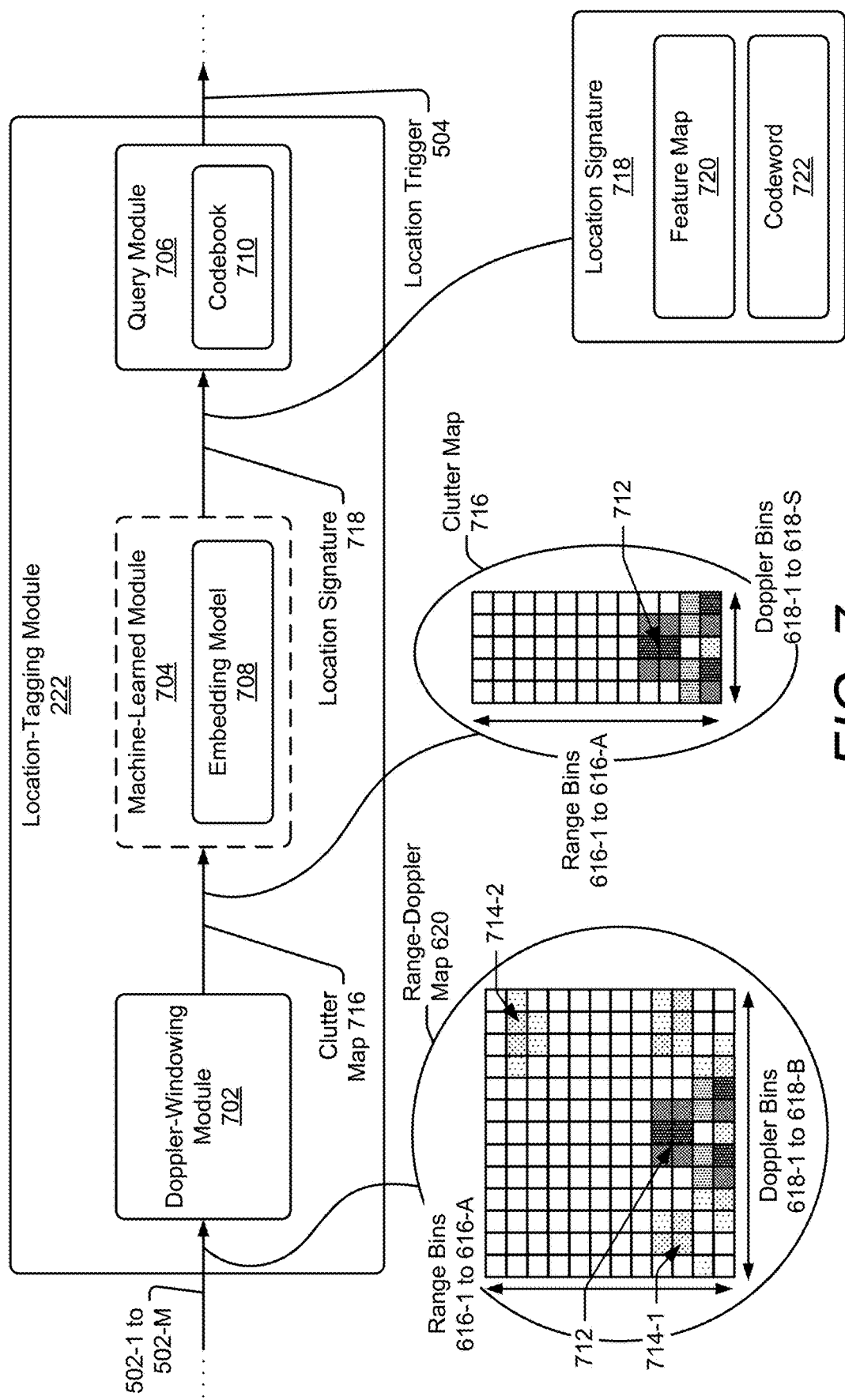
FIG. 7 illustrates an example location-tagging module for location tagging.

FIG. 7 illustrates an example location-tagging module 222 for performing location tagging. In the depicted configuration, the location-tagging module 222 includes a Doppler-windowing module 702, an optional machine-learned module 704, and a query module 706. The Doppler-windowing module 702 enables the location-tagging module 222 to ignore moving objects within the external environment. In this way, the location-tagging module 222 can evaluate stationary objects in order to recognize a particular location.

The machine-learned module 704 includes at least one artificial neural network (e.g., neural network). A neural network includes a group of connected nodes (e.g., neurons or perceptrons), which are organized into one or more layers. As an example, the machine-learned module 704 includes a deep neural network, which includes an input layer, an output layer, and one or more hidden layers positioned between the input layer and the output layers. The nodes of the deep neural network can be partially-connected or fully connected between the layers.

In some cases, the deep neural network is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network is a feed-forward deep neural network in which the connections between the nodes do not form a cycle. Additionally or alternatively, the machine-learned module 704 can include another type of neural network, such as a convolutional neural network.

The machine-learned module 704 uses machine learning to identify particular features associated with a location. In some implementations, the machine-learned module 704 includes an embedding model 708, which can reduce memory demands and improve processing speeds. The embedding model 708 can be implemented as an autoencoder, which uses unsupervised learning to learn a transformation function for generating a lower-dimensional representation of an input, such as a clutter map 716.

An example off-line training procedure provides the embedding model 708 with a collection of inputs associated with different locations. In some cases, the collection of inputs can include pre-recorded data that is collected by a radar system 102 at different locations within a same room and/or at different locations within different rooms. In other cases, a lab is reconfigured with different types of furniture or objects, and the collection of inputs includes pre-recorded data that is collected by the radar system 102 for these different lab configurations. Using unsupervised learning, the embedding model 708 adjusts machine-learning parameters (e.g., coefficients, weights, or biases) to output unique lower-dimensional representations for each input. By learning to generate lower-dimensional representations of inputs, the embedding model 708 can reduce the complexity of the query module 706 as well as the computational resources utilized by the query module 706.

The query module 706 includes a codebook 710, which stores information that uniquely represents features of known locations (e.g., previously-calibrated locations). In some implementations, the codebook 710 can operate as a look-up table (LUT). Using the codebook 710, the query module 706 determines whether or not a current location of the smart device 104 is associated with one of the known locations stored in the codebook 710. Sometimes, the query module 706 can use thresholding logic to recognize whether or not to update one or more entries within the codebook 710. If the information about a current location has changed significantly, for instance, the query module 706 can replace a previous entry associated with the current location with a current entry. If the smart device 104 has sufficient memory, the codebook 710 can include multiple entries associated with a same location. These entries can represent variations in the external environment, including changes in the locations of some of the stationary objects.

In some implementations, the query module 706 uses an algorithm to determine whether or not a current location of the smart device 104 is associated with one of the known locations stored in the codebook 710. Example algorithms can include a comparison function or a difference function, which can quantify an amount of similarity between features of the current location and features of the known locations within the codebook 710. In other implementations, the query module 706 is implemented as part of the machine-learned module 704 using one or more layers. In this case, the query module 706 uses a trained classification model to recognize a current location. In some implementations, the query module 706 relies on supervised learning and can record measured (e.g., real) data for machine-learning training purposes. Training enables the query module 706 to learn a mapping function for recognizing different locations, as further described below.

An example on-line training procedure prompts a user to position the smart device 104 at a desired location and provide a location tag, which is used to identify (or label) the location. An example location can include a common location of the smart device 104, such as on a desk, a table, or a mount. Sometimes this location can be within a particular room of a building or home, such as an office, a kitchen, a bedroom, a dining room, or a bathroom. While the smart device 104 is at this location, the query module 706 records the location signature 718 that is provided as input and the location tag provided by the user. In this case, the location tag represents truth data. This recording process can be repeated for multiple locations within the building or home, including at other locations within a same room or other locations within different rooms.

With the collection of recorded location signatures 718 and location tags, the query module 706 uses supervised learning to determine machine-learning parameters (e.g., coefficients, weights, or biases) that enable the query module 706 to recognize each location. The determined machine-learning parameters are stored by the system medium 218 to enable future locations of the smart device 104 at the trained locations to be recognized. In some cases, this training process can be repeated multiple times at a same location to account for changes in the external environments (e.g., locations of one or more stationary objects changing or the presence or lack of presence of particular objects within the external environment).

During operation, the location-tagging module 222 accepts the complex radar data 502-1 to 502-M from the hardware-abstraction module 220. The complex radar data 502-1 to 502-M can be in the form of one or more range-Doppler maps 620, as described in FIG. 6-2. In some implementations, the radar system 102 performs digital beamforming to provide the complex radar data 502-1 to 502-M in the form of a four-dimensional range-Doppler-azimuth-elevation map. In general, the complex radar data 502-1 to 502-M includes at least range (e.g., slant range) and Doppler information associated with objects in the external environment. To further enhance the ability of the radar system 102 to recognize different locations, the complex radar data 502-1 to 502-M can also include implicit or explicit angular information (e.g., range-Doppler maps 620 associated with different receive channels 410 or the range-Doppler-azimuth-elevation map).

In FIG. 7, the complex radar data 502-1 to 502-M includes the range-Doppler map 620. In this example, the amplitude (or magnitude) information of the range-Doppler map 620 is illustrated with different patterns. Larger amplitudes are represented with patterns that have a larger percentage of black. Smaller amplitudes are represented with patterns that have a smaller percentage of black (e.g., a higher percentage of white). Although not shown, the range-Doppler map 620 can also include phase information. Each range bin 616 and Doppler bin 618 contains amplitude information for a particular range interval (e.g., slant-range interval or distance interval) and Doppler frequency interval.

The range-Doppler map 620 is shown to include amplitude information associated with at least one stationary object 712 and amplitude information associated with one or more moving objects 714 (e.g., moving objects 714-1 and 714-2). The Doppler-windowing module 702 filters (e.g., removes) a portion of the Doppler Bins 618-1 to 618-B associated with the moving objects 714-1 and 714-2 and passes a remaining portion of the Doppler Bins 618-1 to 618-S associated with relatively slow or stationary objects, including the stationary object 712. The variable S represents a positive integer that is less than B. For example, the Doppler-windowing module 702 generates a clutter map 716, which represents a slow-Doppler region of the range-Doppler map 620. The clutter map 716 includes information about the stationary object 712 and excludes information about the moving objects 714-1 and 714-2.

The clutter map 716 includes the range bins 616-1 to 616-A and Doppler bins 618-1 to 618-S. The Doppler bins 618-1 to 618-S are slow Doppler bins 618 associated with a small percentage of a pulse-repetition frequency (PRF) of the radar system 102. As such, the frequencies represented by the slow Doppler bins 618-1 to 618-S correspond to relatively slow or stationary range rates. Example Doppler frequencies of the slow Doppler bins 618-1 to 618-S can be less than or equal to 10% of the PRF, such as between approximately 0% and 5% of the PRF. As an example, the slow Doppler bins can include the zero, positive one, and negative one Doppler bins 618, for instance. In some cases, the slow Doppler bins can include additional Doppler bins 618, such as the positive two and negative two Doppler bins 618. If the location-tagging module 222 does not include the machine-learned module 704, the Doppler-windowing module 702 can provide the clutter map 716 directly to the query module 706. Otherwise, the Doppler-windowing module 702 provides the clutter map 716 to the machine-learned module 704.

The machine-learned module 704 accepts the clutter map 716. In some implementations, the clutter map 716 includes multiple clutter maps 716 respectively associated with the different receive channels of the complex radar data 502-1 to 502-M. In other implementations, the clutter map 716 includes a single clutter map 716 with angular information (e.g., a filtered version of the range-Doppler-azimuth-elevation map). The amplitude and/or phase information of individual cells within the clutter map 716 are provided to individual nodes of an input layer of the machine-learned module 704.

The machine-learned module 704 analyzes the clutter map 716 to generate a location signature 718. The location signature 718 identifies features of the external environment, such as the position of one or more objects (e.g., walls, tables, lamps, or electronics), material properties of these objects (e.g., reflection coefficients, radar cross sections, or estimated material compositions), and/or dimensions (e.g., size) of these objects (e.g., length, width, or depth). In some implementations that do not include the machine-learned module 704, the location signature 718 can include a feature map 720, which includes explicit spatial information of the objects within the external environment. As an example, the feature map 720 can represent a point cloud. In particular, the Doppler-windowing module 702 can provide the clutter map 716 as the feature map 720.

If the location-tagging module 222 includes the machine-learned module 704 with the embedding model 708, the embedding module 708 can provide a codeword 722 (e.g., a vector) as the location signature 718. The codeword 722 represents a simplified or lower-dimensional representation of the feature map 720. In this way, the codeword 722 can utilize less memory than the feature map 720, which can enable the radar system 102 to be implemented in memory-constrained devices. As an example, the codeword 722 can include a vector of 16 numbers, which can be derived from the clutter map 716 and used to uniquely identify the location. In some cases, the codeword 722 does not include explicit spatial information about the objects in the external environment. Instead, the codeword 722 includes implicit spatial information about the external environment. The machine-learned module 704 provides the location signature 718 to the query module 706.

During a calibration procedure or the on-line training procedure, the query module 706 stores the location signature 718 within the codebook 710 for future reference. During normal operation, the query module 706 compares the current location signature 718 provided by the machine-learned module 704 to previously-stored location signatures 718 within the codebook 710 to recognize a current location of the smart device 104. The query module 706 recognizes the current location based on the previously-stored location signature 718 that is a closest match to the current location signature 718. To prevent false reports, the query module 706 can further determine that the closest matching previously-stored location signature 718 has a sufficient percentage of similar features as the current location signature 718 prior to declaring location recognition. In this way, the query module 706 can avoid incorrectly identifying an unknown location as a known location.

Having the location signatures 718 in the form of codewords 722 can significantly improve the efficiency and speed of the query or matching process performed by the query module 706. In this case, the query module 706 can calculate a Euclidean distance between the current location signature 718 and the previously-stored location signatures 718 within the codebook 710. The previously-stored location signature 718 that results in the smallest Euclidean distance provides the closest match to the current location signature 718. Computing and comparing Euclidean distances for small vectors associated with the codewords 722 can be significantly less computationally intensive than comparing feature maps 720. Additionally, the query module 706 compares the smallest Euclidean distance to a predetermined threshold. If the smallest Euclidean distance is less than or equal to the predetermined threshold (e.g., if the previously-stored location signature 718 is sufficiently similar to the current location signature 718), the query module 706 recognizes the current location. Otherwise, if the smallest Euclidean distance is greater than the predetermined threshold, the query module 706 does not recognize the current location (e.g., determines that the current location is not associated with a known location).

If the query module 706 recognizes the current location of the smart device 104, the query module 706 can generate the location trigger 504, which is provided to the computer processor 202. The location trigger 504 causes the computer processor 202 to open the application 206 or activate the setting 206 associated with the current location.

Example Methods

Figure 8:
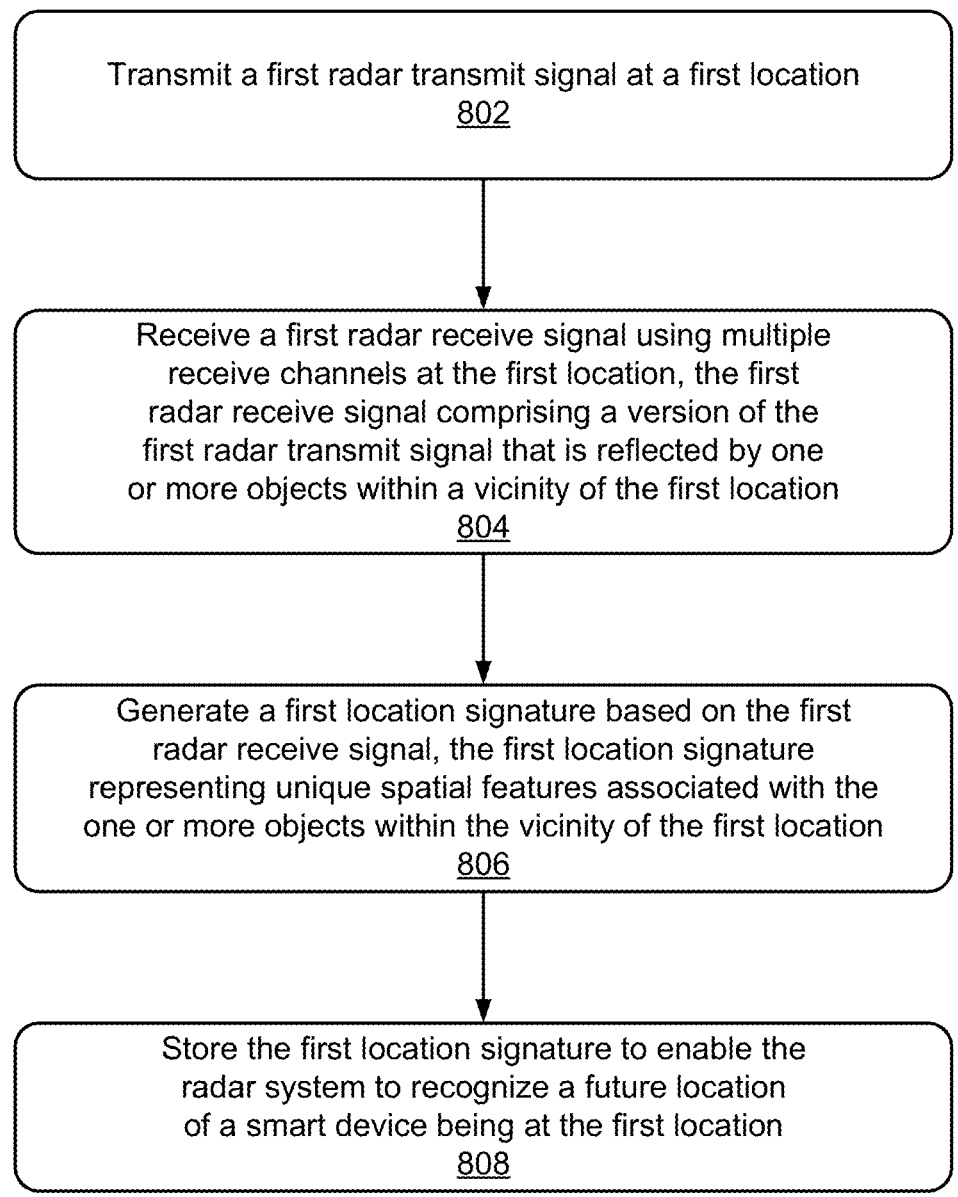
FIG. 8 illustrates an example method for performing a calibration procedure of a smart-device-based radar system for location tagging.

FIG. 8 depicts an example method 800 for performing a calibration procedure of a smart-device-based radar system for location tagging. Method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-7 of FIG. 1, and entities detailed in FIG. 2 or 5, reference to which is made for example only. The techniques are not limited to performance by one entity or multiple entities operating on one device.

At 802, a first radar transmit signal is transmitted using a radar system. For example, the radar system 102 transmits the radar transmit signal 306, as shown in FIG. 3-1. The radar transmit signal 306 can include multiple chirps 310-1 to 310-N, whose timing can be determined based on the radar framing structure 312 of FIG. 3-2. In general, the radar transmit signal 306 includes frequencies within the super-high frequency band or the extremely-high frequency band.

In example implementations, the radar transmit signal 306 includes frequencies that are greater than or equal to 24 GHz. For example, the radar transmit signal 306 can include frequencies approximately between 57 and 64 GHz. Using high frequencies associated with millimeter wavelengths can mitigate the interference from wireless communication signals within lower-frequency bands and improve the range resolution of the radar system 102. A footprint of the radar system 102 can also be made relatively small, thereby enabling the radar system 102 to be integrated within space-constrained devices. As an example, a footprint of the radar system 102's radio-frequency front-end circuit (with antennas included) can be approximately four millimeters by six millimeters.

At 804, a first radar receive signal is received at the first location using multiple receive channels of the radar system. The first radar receive signal comprises a version of the first radar transmit signal that is reflected by one or more objects within a vicinity of the first location. For example, the radar system 102 receives the radar receive signal 308 using multiple receive channels 410-1 to 410-M, as shown in FIG. 4. The radar receive signal 308 represents a version of the radar transmit signal 306 that is reflected by one or more objects within the external environment (e.g., an inanimate object, a user, or an animal), as shown in FIG. 3-1. In general, the object is within a vicinity of the first location, which is defined by an effective detectable range of the radar system 102.

At 806, a first location signature is generated based on the first radar receive signal. The first location signature represents unique spatial features associated with the one or more objects within the vicinity of the first location. For example, the radar system 102 generates the location signature 718 of FIG. 7 based on the radar receive signal 308. In particular, the radar system 102 generates complex radar data 502-1 to 502-M based on the radar receive signal and uses machine learning (e.g., the location-tagging module 222) to determine the location signature 718 based on the complex radar data 502-1 to 502-M. In some implementations, the radar system 102 filters the complex radar data 502-1 to 502-M of moving objects so that the location signature 718 can represent the stationary objects detected within the external environment.

The location signature 718 can include a feature map 720 and/or a codeword 722, each of which represents the unique spatial features of the first location (e.g., unique spatial features associated with the one or more objects within the vicinity of the first location). The feature map 720 includes explicit spatial information, such as the position of objects relative to the radar system 102. In some cases, the location signature 718 can include the material composition and/or size information about the objects. In contrast, the codeword 722 can include implicit spatial information about the objects in the form of a one-dimensional vector.

At 808, the first location signature is stored to enable the radar system to recognize a future location of the smart device being at the first location. For example, the radar system 102 stores the location signature 718 within the codebook 710 of FIG. 7. The radar system 102 can also prompt the user to provide a location tag and store the location tag along with the location signature 718 within the codebook 710. At a later time, the query module 706 accesses the codebook 710 to recognize a future location of the smart device 104 being at this first location. In this sense, the radar system 102 tags information about a current location of the smart device 104 for future reference.

Although not shown, the smart device 104 can prompt the user to specify one or more applications or settings 206 associated with the first location. This enables the smart device 104 to activate a desired application or setting 206 responsive to the radar system 102 recognizing that the smart device 104 is at the first location, as further described with respect to FIG. 9.

Figure 9:
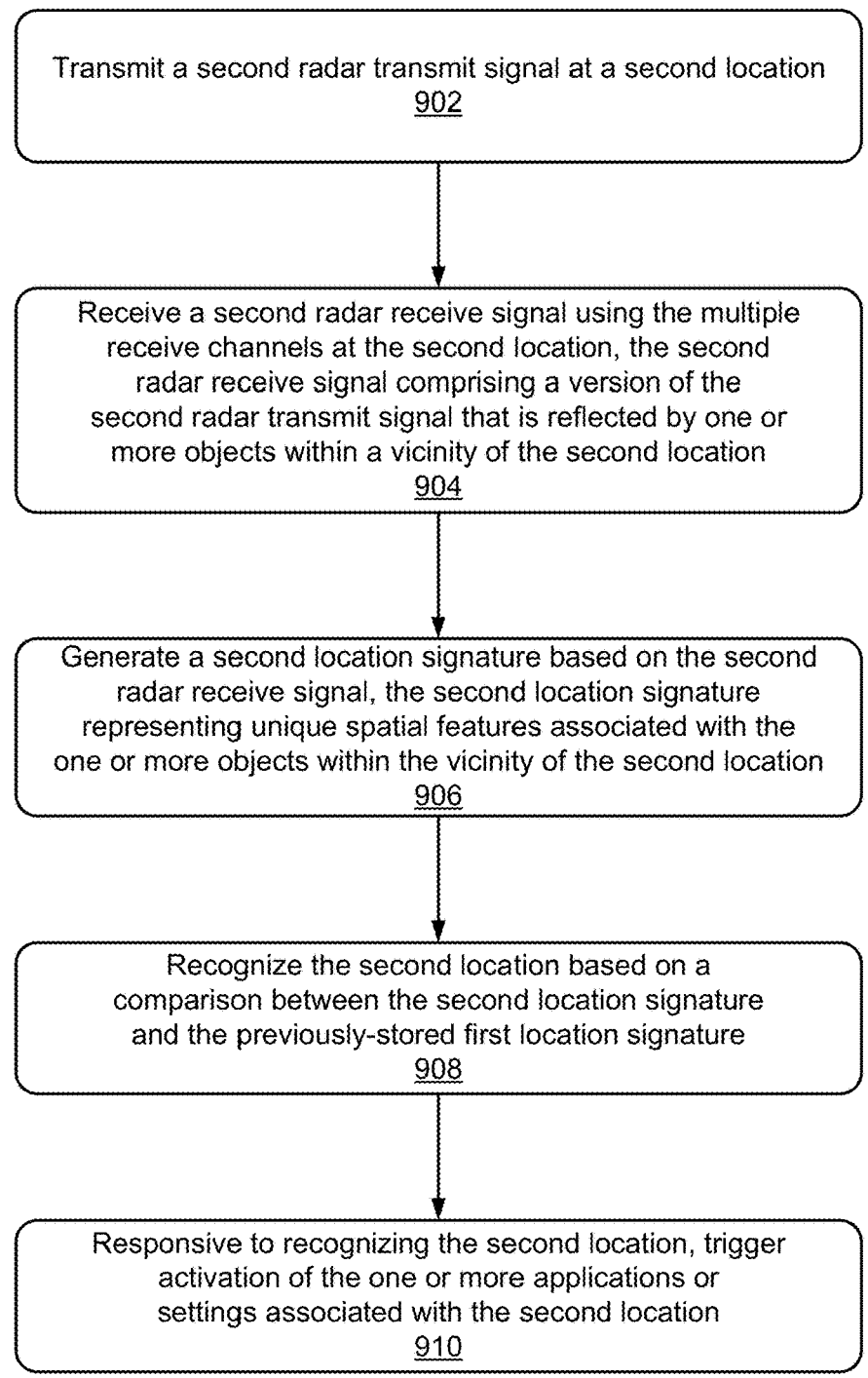
FIG. 9 illustrates another example method for performing location tagging using a smart-device-based radar system.

FIG. 9 depicts an example method 900 for performing location tagging using a smart-device-based radar system. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-7 of FIG. 1, and entities detailed in FIG. 2 or 5, reference to which is made for example only. The techniques are not limited to performance by one entity or multiple entities operating on one device.

At 902, a second radar transmit signal is transmitted at a second location. For example, the radar system 102 transmits another radar transmit signal 306, as shown in FIG. 3-1. The second radar transmit signal 306 can have similar properties as the first radar transmit signal described at 802. The second location can be a same or different location as the first location at 802.

At 904, a second radar receive signal is received at the second location using the multiple receive channels at the second location. The second radar receive signal comprises a version of the second radar transmit signal that is reflected by one or more objects within a vicinity of the second location. For example, the radar system 102 receives the radar receive signal 308 using multiple receive channels 410-1 to 410-M, as shown in FIG. 4. The radar receive signal 308 represents a version of the radar transmit signal 306 that is reflected by one or more objects within the external environment, as shown in FIG. 3-1. In general, the object is within a vicinity of the second location, which is defined by an effective detectable range of the radar system 102.

At 906, a second location signature is generated based on the second radar receive signal. The second location signature represents unique spatial features associated with the one or more objects within the vicinity of the second location. For example, the radar system 102 generates the location signature 718 based on the radar receive signal 308. In particular, the radar system 102 generates complex radar data 502-1 to 502-M based on the radar receive signal and uses machine learning (e.g., the location-tagging module 222) to determine the location signature 718 based on the complex radar data 502-1 to 502-M. In some implementations, the radar system 102 filters the complex radar data 502-1 to 502-M of moving objects so that the location signature 718 can represent the stationary objects detected within the external environment. As described above with respect to 806, the location signature 718 can include the feature map 720 and/or the codeword 722.

At 908, the second location is recognized based on a comparison between the second location signature and the previously-stored first location signature. For example, the radar system 102 recognizes the second location based on a comparison between the second location signature generated at 906 and the previously-stored first location signature, described at 806 and 808. The radar system 102 can also verify that there is a sufficient amount of similarly between the previously-stored first location signature and the second location signature prior to recognizing the second location. If the second location is not recognized, the radar system 102 can store the second location signature within the codebook 710 for future reference.

At 910, responsive to recognizing the second location, activation of one or more applications or settings associated with the second location are triggered. For example, the radar system 102 provides the location trigger 504 to the computer processor 202 to trigger the activation of one or more applications or settings 206 associated with the second location. These applications or settings 206 can be preprogrammed or selected by the user during the calibration procedure.

Example Computing System

Figure 10:
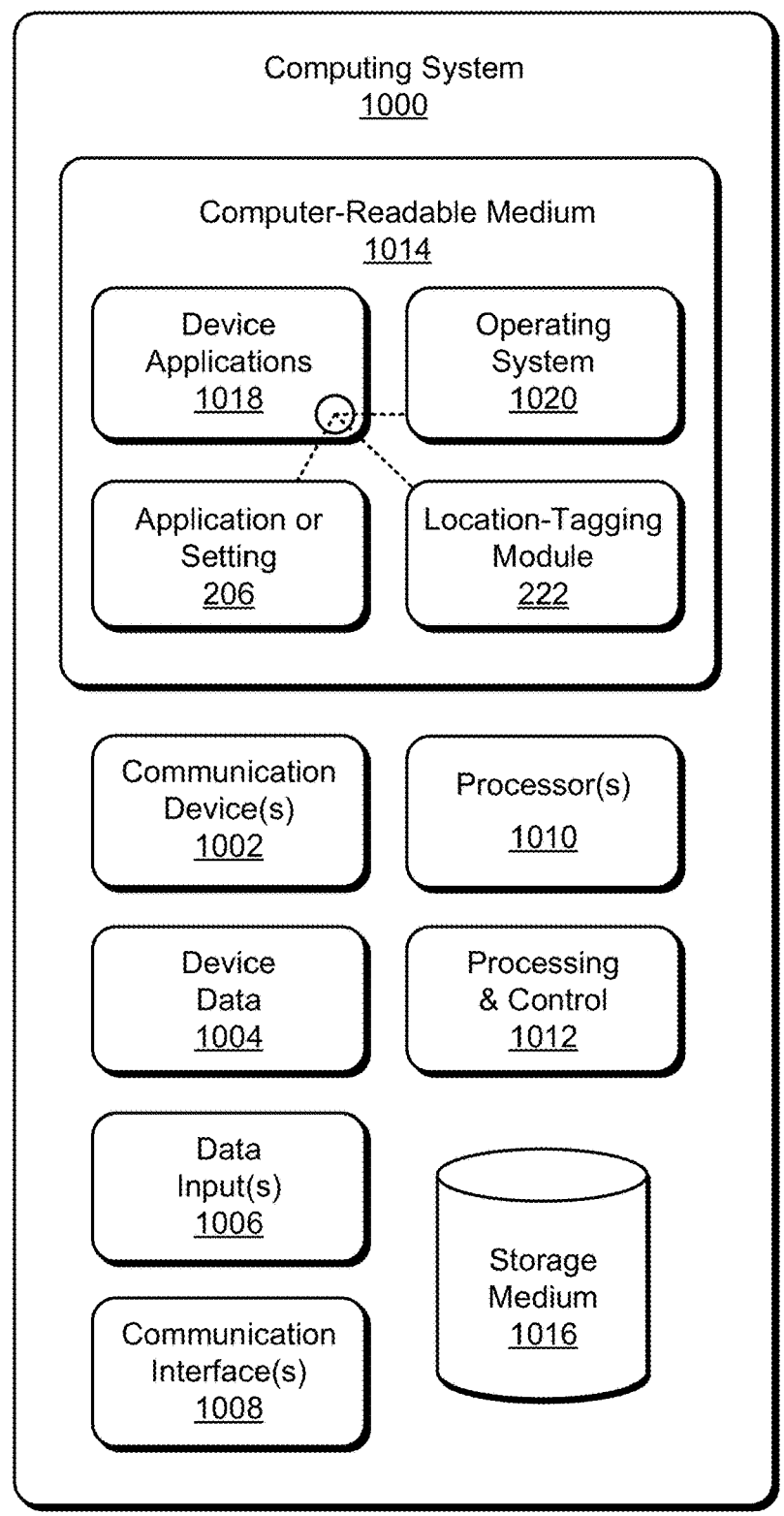
FIG. 10 illustrates an example computing system embodying, or in which techniques may be implemented that enable use of, a radar system capable of performing location tagging.

FIG. 10 illustrates various components of an example computing system 1000 that can be implemented as any type of client, server, and/or computing device as described with reference to the previous FIG. 2 to implement location tagging.

The computing system 1000 includes communication devices 1002 that enable wired and/or wireless communication of device data 1004 (e.g., received data, data that is being received, data scheduled for broadcast, or data packets of the data). Although not shown, the communication devices 1002 or the computing system 1000 can include one or more radar systems 102. The device data 1004 or other device content can include configuration settings of the device, media content stored on the device, and/or information associated with a user of the device. Media content stored on the computing system 1000 can include any type of audio, video, and/or image data. The computing system 1000 includes one or more data inputs 1006 via which any type of data, media content, and/or inputs can be received, such as human utterances, any type of data provided by the radar system 102, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, location tagging. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable medium 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage medium device (storage medium) 1016.

The computer-readable medium 1014 provides data storage mechanisms to store the device data 1004, as well as various device applications 1018 and any other types of information and/or data related to operational aspects of the computing system 1000. For example, an operating system 1020 can be maintained as a computer application with the computer-readable medium 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers to implement location tagging. In this example, the device applications 1018 includes the application or setting 206 and the location-tagging module 222 of FIG. 2.

CONCLUSION

Although techniques using, and apparatuses including, a smart-device-based radar system capable of performing location tagging have been described in language specific to features and/or methods, it is to be understood that the subject of the appended claims is not necessarily limited to the specific features or methods described. Rather, the specific features and methods are disclosed as example implementations of a smart-device-based radar system performing location tagging.

Some examples are described below:

Example 1: A method performed by a radar system of a smart device, the method comprising:
  transmitting a first radar transmit signal at a first location, the smart device being at the first location;
  receiving a first radar receive signal using multiple receive channels of the radar system at the first location, the first radar receive signal comprising a version of the first radar transmit signal that is reflected by one or more objects within a vicinity of the first location;
  generating a first location signature based on the first radar receive signal, the first location signature representing unique spatial features associated with the one or more objects within the vicinity of the first location;
  recognizing the first location based on a comparison of the first location signature to a previously-stored location signature associated with the first location; and
  responsive to recognizing the first location, triggering activation of one or more applications or settings of the smart device, the one or more applications or settings associated with the first location.

Example 2: The method of example 1, wherein:
the previously-stored location signature includes a second location signature; and
the method further comprises, prior to transmitting the first radar transmit signal:
  transmitting a second radar transmit signal at a second location, the smart device being at the second location;
  receiving a second radar receive signal using the multiple receive channels at the second location, the second radar receive signal comprising a version of the second radar transmit signal that is reflected by one or more other objects within a vicinity of the second location;
  generating the second location signature based on the second radar receive signal, the second location signature representing other unique spatial features associated with the one or more other objects within the vicinity of the second location; and
  storing the second location signature to enable the radar system to recognize a future location of the smart device being at the second location.

Example 3: The method of example 2, further comprising, prior to transmitting the first radar transmit signal, prompting a user to specify the one or more applications or settings associated with the second location.

Example 4: The method of any preceding example, wherein the one or more applications or settings comprises at least one of the following:
  a calendar application;
  an alarm clock application;
  a map application;
  a news application;
  a social media application;
  a volume setting;
  a wireless setting; or
  a power-saving setting.

Example 5: The method of any preceding example, wherein:
  the previously-stored location signature comprises multiple previously-stored location signatures associated with previous locations; and
  the previous locations include one or more of the following:
    first locations within a same room of a building;
    second locations within different rooms of the building;
    third locations within different buildings; or
    a fourth location within a vehicle.

Example 6: The method of any preceding example, wherein:
  the one or more objects within the vicinity of the first location comprise stationary objects and moving objects; and
  the generating of the first location signature comprises:
    generating complex radar data associated with the multiple receive channels of the radar system, the complex radar data including information associated with the stationary objects and the moving objects;

filtering the complex radar data to remove information associated with the moving objects and include information associated with the stationary objects;
generating a clutter map based on the filtered complex radar data; and
analyzing the clutter map using machine learning to generate the first location signature.

Example 7: The method of example 6, wherein the complex radar data comprises at least one of the following:
multiple range-Doppler maps respectively associated with the multiple receive channels;
complex interferometry data associated with each of the multiple receive channels;
pre-processed complex radar data associated with each of the multiple receive channels;
multiple digital beat signals associated with the multiple receive channels, the multiple digital beat signals derived from the first radar receive signal; or
a range-Doppler-azimuth-elevation map.

Example 8: The method of any preceding example, wherein the first location signature comprises at least one of the following:
a feature map comprising explicit spatial information about the one or more objects within the vicinity of the first location; or
a codeword comprising a vector having implicit spatial information about the one or more objects within the vicinity of the first location.

Example 9: The method of any preceding example, wherein the first radar transmit signal includes frequencies greater than or equal to 24 gigahertz.

Example 10: The method of example 9, wherein the frequencies are approximately between 57 and 64 gigahertz.

Example 11: The method of any preceding example, wherein at least one location signature is based on range, azimuth, and/or elevation data derived from radar data, in particular complex radar data.

Example 12: The method of any preceding example, wherein a location-tagging module comprises at least one Doppler-windowing module, at least one machine-learned module, in particular for generating a location signature, or at least one query module.

Example 13: An apparatus comprising:
a radar system comprising:
an antenna array; and
a transceiver comprising at least two receive channels respectively coupled to antenna elements of the antenna array;
a processor; and
a computer-readable storage medium comprising computer-executable instructions that, responsive to execution by the processor, implement a location-tagging module,
the radar system, the processor, and the computer-readable storage medium jointly configured to perform any of the methods of examples 1 to 12.

Example 14: The apparatus of example 13, wherein the apparatus comprises a smart device, the smart device comprising one of the following:
a smartphone;
a smart watch;
a smart speaker;
a smart thermostat;
a security camera;
a gaming system; or
a household appliance.

Example 15: The apparatus of example 13 or 14, wherein the processor and the computer-readable storage medium are integrated within the radar system.

Example 16: The apparatus according to any of examples 13 to 15, wherein the antenna array comprises two, three, or four antenna elements.

Example 17: The apparatus according to any of examples 13 to 16, wherein the radar system consumes less than 20 milliwatts of power.

Example 18: The apparatus according to any of examples 13 to 17, wherein at least one location signature is based on range, azimuth, and/or elevation data derived from radar data, in particular complex radar data.

Example 19: The apparatus according to any of examples 13 to 18, wherein the location-tagging module comprises at least one Doppler-windowing module, at least one machine-learned module, in particular for generating a location signature, or at least one query module.

Example 20: The apparatus according to any of examples 13 to 19, wherein:
the previously-stored location signature includes a second location signature; and
the radar system is further configured to, prior to transmitting the first radar transmit signal:
transmit a second radar transmit signal at a second location, the apparatus being at the second location;
receive a second radar receive signal using the multiple receive channels at the second location, the second radar receive signal comprising a version of the second radar transmit signal that is reflected by one or more other objects within a vicinity of the second location;
generate the second location signature based on the second radar receive signal, the second location signature representing other unique spatial features associated with the one or more other objects within the vicinity of the second location; and
store the second location signature to enable the radar system to recognize a future location of the apparatus being at the second location.

The invention claimed is:
1. A method performed by a radar system of a mobile smart device, the method comprising:
transmitting a radar transmit signal at an interior location within a building, the mobile smart device being at the interior location;
receiving a radar receive signal using multiple receive channels of the radar system at the interior location, the radar receive signal comprising a version of the radar transmit signal that is reflected by objects within an external environment of the mobile smart device at the interior location;
generating a location signature associated with the interior location within the building based on the radar receive signal by processing the radar receive signal to remove information associated with moving objects and include information associated with stationary objects within the external environment of the mobile smart device, the location signature representing unique spatial features associated with one or more of the stationary objects within the external environment of the mobile smart device at the interior location within the building;
comparing the location signature associated with the interior location within the building to previously-stored location signatures, the previously-stored loca- tion signatures associated with respective interior locations at which the mobile smart device was previously located;
determining a location of the mobile smart device as the interior location within the building based on the location signature associated with the interior location matching one of the previously-stored location signatures that is associated with the interior location; and
responsive to determining the location of the mobile smart device as the interior location within the building, triggering activation of one or more applications or settings of the mobile smart device that are associated with the interior location.

2. The method of claim 1, wherein:
the radar transmit signal comprises a first radar transmit signal, the location signature associated with the interior location is a first location signature, the radar receive signal comprises a first radar receive signal, the one of the previously-stored location signatures comprises a second location signature associated with the interior location; and
the method further comprises, prior to transmitting the first radar transmit signal:
transmitting a second radar transmit signal at the interior location, the mobile smart device being at the interior location;
receiving a second radar receive signal using the multiple receive channels at the interior location, the second radar receive signal comprising a version of the second radar transmit signal that is reflected by the objects within the external environment of the mobile smart device at the interior location;
generating the second location signature associated with the interior location based on the second radar receive signal, the second location signature representing the unique spatial features associated with the one or more stationary objects within the external environment of the mobile smart device at the interior location; and
storing the second location signature associated with the interior location to enable the radar system to determine a future location of the mobile smart device as the interior location.

3. The method of claim 1, further comprising, prior to transmitting the radar transmit signal:
prompting a user to specify the one or more applications or settings associated with the interior location; and
associating the one or more applications or settings of the mobile smart device with the interior location.

4. The method of claim 1, wherein the one or more applications or settings of the mobile smart device comprises at least one of:
a calendar application;
an alarm clock application;
a map application;
a news application;
a social media application;
a volume setting;
a wireless setting; or
a power-saving setting.

5. The method of claim 1, wherein:
the respective interior locations with which the previously-stored location signatures are associated include one or more of:
multiple interior locations within a same room of the building;
multiple interior locations within different rooms of the building; or
multiple interior locations within the building and at least one other buildings.

6. The method of claim 1, wherein:
the generating of the location signature further comprises:
generating, based on radar receive signal, complex radar data associated with the multiple receive channels of the radar system, the complex radar data including information associated with the stationary objects and the moving objects;
filtering the complex radar data to remove the information associated with the moving objects and include the information associated with the stationary objects;
generating a clutter map based on the filtered complex radar data; and
analyzing the clutter map using machine learning to generate the location signature.

7. The method of claim 6, wherein the complex radar data comprises at least one of:
multiple range-Doppler maps respectively associated with the multiple receive channels;
complex interferometry data associated with each of the multiple receive channels;
pre-processed complex radar data associated with each of the multiple receive channels;
multiple digital beat signals associated with the multiple receive channels, the multiple digital beat signals derived from the radar receive signal; or
a range-Doppler-azimuth-elevation map.

8. The method of claim 1, wherein the location signature comprises at least one of:
a feature map comprising explicit spatial information about the one or more stationary objects within the external environment of the mobile smart device at the interior location; or
a codeword comprising a vector having implicit spatial information about the one or more stationary objects within the external environment of the mobile smart device at the interior location.

9. The method of claim 1, wherein the radar transmit signal includes frequencies greater than or equal to 24 gigahertz.

10. The method of claim 9, wherein the frequencies are approximately between 57 and 64 gigahertz.

11. The method of claim 1, wherein at least one location signature is based on range, azimuth, or elevation data derived from radar data, in particular complex radar data.

12. The method of claim 1, wherein a location-tagging module comprises at least one Doppler-windowing module, at least one machine-learned module, in particular for generating a location signature, or at least one query module.

13. A mobile apparatus comprising a radar system configured to:
transmit a radar transmit signal at an interior location within a building, the mobile apparatus being at the interior location;
receive a radar receive signal using multiple receive channels of the radar system at the interior location, the radar receive signal comprising a version of the radar transmit signal that is reflected by objects within an external environment of the mobile apparatus at the interior location;
generate a location signature based on the radar receive signal by processing the radar receive signal to remove information associated with moving objects and include information associated with stationary objects within the external environment, the location signature representing unique spatial features associated with one or more of the stationary objects within the external environment of the mobile apparatus at the interior location within the building;

compare the location signature associated with the interior location within the building to previously-stored location signatures, the previously-stored location signatures associated with respective interior locations at which the mobile apparatus was previously located;

determining a location of the mobile apparatus as the interior location within the building based on the location signature associated with the interior location matching one of the previously-stored location signatures that is associated with the interior location within the building; and responsive to determining the location of the mobile apparatus as the interior location within the building, trigger activation of one or more applications or settings of the mobile apparatus that are associated with the interior location within the building.

14. The mobile apparatus of claim 13, wherein the mobile apparatus comprises one of:
- a smartphone;
- a smart watch;
- a smart speaker;
- a smart sensor;
- a security camera;
- a gaming system; or
- a household appliance.

15. The mobile apparatus of claim 13, wherein at least one of the location signature or previously-stored location signatures is based on range, azimuth, or elevation data derived from radar data, in particular complex radar data.

16. The mobile apparatus of claim 13, wherein the radar system comprises at least one of:
- a location-tagging module configured to compare the location signature associated with the interior location to previously-stored location signatures;
- a Doppler-windowing module;
- a machine-learned module configured to generate the location signature; or
- a query module configured to query a user for the one or more applications or settings of the mobile apparatus to associated with the interior location.

17. The mobile apparatus of claim 13, wherein:
the radar transmit signal comprises a first radar transmit signal, the location signature associated with the interior location is a first location signature, the radar receive signal comprises a first radar receive signal, the one of the previously-stored location signatures comprises a second location signature associated with the interior location; and
the radar system is further configured to, prior to transmission of the first radar transmit signal:
transmit a second radar transmit signal at the interior location, the mobile apparatus being at the interior location;
receive a second radar receive signal using the multiple receive channels at the interior location, the second radar receive signal comprising a version of the second radar transmit signal that is reflected by the objects within the external environment of the mobile apparatus at the interior location;
generate the second location signature associated with the interior location based on the second radar receive signal, the second location signature representing the unique spatial features associated with the one or more stationary objects within the external environment of the mobile apparatus at the interior location; and
store the second location signature associated with the interior location to enable the radar system to determine a future location of the mobile apparatus as the interior location.

18. The mobile apparatus of claim 13, wherein the radar system is further configured to, prior to transmission of the radar transmit signal:
prompt a user to specify the one or more applications or settings associated with the interior location; and
associate the one or more applications or settings of the mobile apparatus with the interior location.

19. The mobile apparatus of claim 13, wherein the one or more applications or settings of the mobile apparatus comprises at least one of:
- a calendar application;
- an alarm clock application;
- a map application;
- a news application;
- a social media application;
- a volume setting;
- a wireless setting; or
- a power-saving setting.

20. The mobile apparatus of claim 13, wherein the location signature comprises at least one of:
- a feature map comprising explicit spatial information about the one or more stationary objects within the external environment of the mobile apparatus at the interior location; or
- a codeword comprising a vector having implicit spatial information about the one or more stationary objects within the external environment of the mobile apparatus at the interior location.

* * * * *